US010629107B2

(12) United States Patent
Yamamoto et al.

(10) Patent No.: US 10,629,107 B2
(45) Date of Patent: Apr. 21, 2020

(54) INFORMATION PROCESSING APPARATUS AND IMAGE GENERATION METHOD

(71) Applicant: Sony Interactive Entertainment Inc., Tokyo (JP)

(72) Inventors: Takashi Yamamoto, Kanagawa (JP); Takakazu Ikeda, Tokyo (JP); Atsushi Takizawa, Saitama (JP); Kenichiro Yokota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/770,419

(22) PCT Filed: Nov. 14, 2016

(86) PCT No.: PCT/JP2016/083657
§ 371 (c)(1),
(2) Date: Apr. 23, 2018

(87) PCT Pub. No.: WO2017/086263
PCT Pub. Date: May 26, 2017

(65) Prior Publication Data
US 2018/0315364 A1    Nov. 1, 2018

(30) Foreign Application Priority Data
Nov. 20, 2015    (JP) .................................. 2015-228121

(51) Int. Cl.
*G09G 5/38*    (2006.01)
*G09G 3/00*    (2006.01)
(Continued)

(52) U.S. Cl.
CPC .......... *G09G 3/007* (2013.01); *G02B 27/017* (2013.01); *G02B 27/02* (2013.01); *G06F 3/147* (2013.01);
(Continued)

(58) Field of Classification Search
CPC .......... G09G 3/007; G09G 3/342; G09G 5/00; G09G 5/38; G02B 27/017; G02B 27/02; G02B 2027/014; G02B 2027/0187
See application file for complete search history.

(56) References Cited

U.S. PATENT DOCUMENTS 5,579,026 A    11/1996 Tabata
5,742,264 A    4/1998 Inagaki
(Continued)

FOREIGN PATENT DOCUMENTS

JP    2007213407 A    8/2007
JP    2015084022 A    4/2015
(Continued)

OTHER PUBLICATIONS

Notification of Reason for Refusal for corresponding JP Application No. 2015-228121, 7 pages, dated Sep. 4, 2018.
(Continued)

*Primary Examiner* — Robert J Michaud
(74) *Attorney, Agent, or Firm* — Matthew B. Dernier, Esq.

(57) ABSTRACT

An information processing apparatus generates a reference image including information to be presented to a user in accordance with a first attitude of an HMD identified at a first point in time. Based on the difference between the first attitude and a second attitude of the HMD identified at a second point in time after the first point in time, the information processing apparatus generates from the reference image a display image to be displayed on the HMD. Upon generation of the display image, the later the timing for displaying a specific image in the display image displayed on the HMD, the larger the amount of displacement is made by the information processing apparatus between the position of the specific pixel in the display image and the position of a corresponding image in the reference image
(Continued)

serving as the source from which to set the pixel value of the specific pixel.

7 Claims, 16 Drawing Sheets

(51) Int. Cl.
| | |
|---|---|
| *G06T 19/00* | (2011.01) |
| *G09G 5/00* | (2006.01) |
| *H04N 5/64* | (2006.01) |
| *G02B 27/02* | (2006.01) |
| *G06F 3/147* | (2006.01) |
| *G09G 5/02* | (2006.01) |
| *G02B 27/01* | (2006.01) |
| *G09G 3/34* | (2006.01) |

(52) U.S. Cl.
CPC ............. *G06T 19/00* (2013.01); *G09G 3/002* (2013.01); *G09G 3/342* (2013.01); *G09G 5/00* (2013.01); *G09G 5/026* (2013.01); *G09G 5/38* (2013.01); *H04N 5/64* (2013.01); *G02B 2027/014* (2013.01); *G02B 2027/0187* (2013.01); *G09G 2320/103* (2013.01); *G09G 2320/106* (2013.01); *G09G 2340/0435* (2013.01); *G09G 2340/14* (2013.01); *G09G 2340/16* (2013.01)

(56) References Cited

U.S. PATENT DOCUMENTS

| | | | |
|---|---|---|---|
| 10,133,073 B2 | 11/2018 | Oto | |
| 2014/0267420 A1* | 9/2014 | Schowengerdt | ........ G06F 3/012 |
| | | | 345/633 |
| 2016/0282619 A1* | 9/2016 | Oto | ...................... G02B 27/017 |

FOREIGN PATENT DOCUMENTS

| | | |
|---|---|---|
| JP | 2015095045 A | 5/2015 |
| JP | 2016520891 A | 7/2016 |
| WO | 2014144526 A2 | 9/2014 |
| WO | 2015068656 A1 | 5/2015 |

OTHER PUBLICATIONS

International Preliminary Report on Patentability and Written Opinion for corresponding PCT Application No. PCT/JP2016/083657, 12 pages, dated May 31, 2018.

International Search Report for corresponding PCT Application No. PCT/JP2016/083657, 4 pages, dated Feb. 7, 2017.

Extended European Search Report for corresponding EP Application No. 16866265.8, 16 pages, dated May 28, 2019.

* cited by examiner

40

FIG. 13
(a) 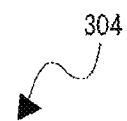
(b) 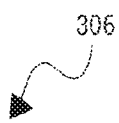

FIG. 14
(a)
(b)

INFORMATION PROCESSING APPARATUS AND IMAGE GENERATION METHOD

TECHNICAL FIELD

The present invention relates to techniques for generating images to be displayed on a head-mounted display.

BACKGROUND ART

A head-mounted display (also called the HMD hereunder) is worn on the head of a user to provide the user with a virtual reality (VR) world. In recent years, there have been applications that allow the user to play video games while watching the screen displayed on the HMD. Existing non-portable display devices such as the television set let the user view an extended visual field range outside the screen. This may prevent the user from concentrating on the screen or from getting the sense of immersion in the ongoing game. In contrast, wearing the HMD enables the user to experience a higher sense of immersion in the visual world and thereby boosts the entertaining nature of the video game. If the HMD is configured to have a head-tracking function that updates the display screen in a linked manner with the attitude of the user's head, the sense of immersion in the visual world is further enhanced.

Recent years have witnessed the widespread use of omni-directional cameras (360-degree cameras) that capture full-azimuth 360-degree panoramic photos. Also, development is underway on unmanned flying objects capable of being remotely piloted. Multiple cameras mounted on such a flying object can capture full-azimuth panoramic photos from the air. If a full-azimuth panoramic photo captured in that manner is displayed on the HMD and if the screen for the display is updated in a linked manner with the attitude of the user's head, the user wearing the HMD is expected to experience the sensation of almost being in the real world.

CITATION LIST

Patent Literature

[PTL 1] JP 2015-95045A

SUMMARY

Technical Problem

It takes some time from the time the attitude of the HMD is detected until an image reflecting the detected attitude is displayed. For this reason, there occurs a little inconsistency in timing between the attitude of the HMD serving as the basis for displaying the image and the actually displayed image. The inconsistency can give a feeling of discomfort to the user watching the image displayed on the HMD.

It has been proposed, for example, that after a first image is generated on the basis of the detected attitude of the HMD, a second image be generated and displayed through transformations such as affine transformation based on a newly detected attitude of the HMD. The proposed technique reduces the feeling of discomfort experienced by the user viewing the image displayed the HMD.

However, the HMD may not display simultaneously all pixels of a display target image. The HMD may be configured to display first the pixels of some regions in the display target image, before displaying the pixels of the other regions in the image. For example, the pixels of the display target image may be displayed successively from the top scanning line down. In this case, the attitude of the HMD may change from the time the display of pixels in the image is started until the image is fully displayed. Thus the image being displayed on the HMD can give the user a feeling of discomfort.

The present invention has been devised in view of the above circumstances. An object of the invention is therefore to provide techniques for implementing display control suitable for the HMD.

Solution to Problem

In solving the above problem and according to one aspect of the present invention, there is provided an information processing apparatus including: a detection section configured to detect the attitude of a head-mounted display worn on the head of a user; a reference image generating section configured to generate a reference image that includes information to be presented to the user in accordance with a first attitude of the head-mounted display identified by the result of detection by the detection section at a first point in time; and a display image generating section configured to generate from the reference image a display image to be displayed on the head-mounted display in accordance with the difference between the first attitude and a second attitude of the head-mounted display identified by the result of detection by the detection section at a second point in time after the first point in time. The later the timing for displaying a specific pixel of the display image during display of the display image on a display section of the head-mounted display, the larger the amount of displacement is made by the display image generating section between the position of the specific pixel in the display image and a corresponding pixel in the reference image serving as the source from which to set the pixel value of the specific pixel.

According to another aspect of the present invention, there is provided an image generating method for causing a computer to perform the steps including: detecting the attitude of a head-mounted display worn on the head of a user; generating a reference image that includes information to be presented to the user in accordance with a first attitude of the head-mounted display identified by the result of detection at a first point in time; and generating from the reference image a display image to be displayed on the head-mounted display in accordance with the difference between the first attitude and a second attitude of the head-mounted display identified by the result of detection at a second point in time after the first point in time. The later the timing for displaying a specific pixel of the display image during display of the display image on a display section of the head-mounted display, the larger the amount of displacement is made in the display image generating step between the position of the specific pixel in the display image and a corresponding pixel in the reference image serving as the source from which to set the pixel value of the specific pixel.

Incidentally, if other combinations of the above-outlined composing elements or the above expressions of the present invention are converted between different forms such as a system, a recording medium that has a computer program readably recorded thereon, and a data structure, they still constitute effective embodiments of this invention.

Advantageous Effect of Invention

According to the present invention, the techniques for implementing display control suitable for the HMD are provided.

BRIEF DESCRIPTION OF DRAWINGS

FIG. 13 is a set of schematic diagrams schematically illustrating simplified reprojection.

FIG. 14 is a set of schematic diagrams schematically illustrating reprojection performed by the embodiment.

DESCRIPTION OF EMBODIMENTS (First embodiment)

Figure 1:
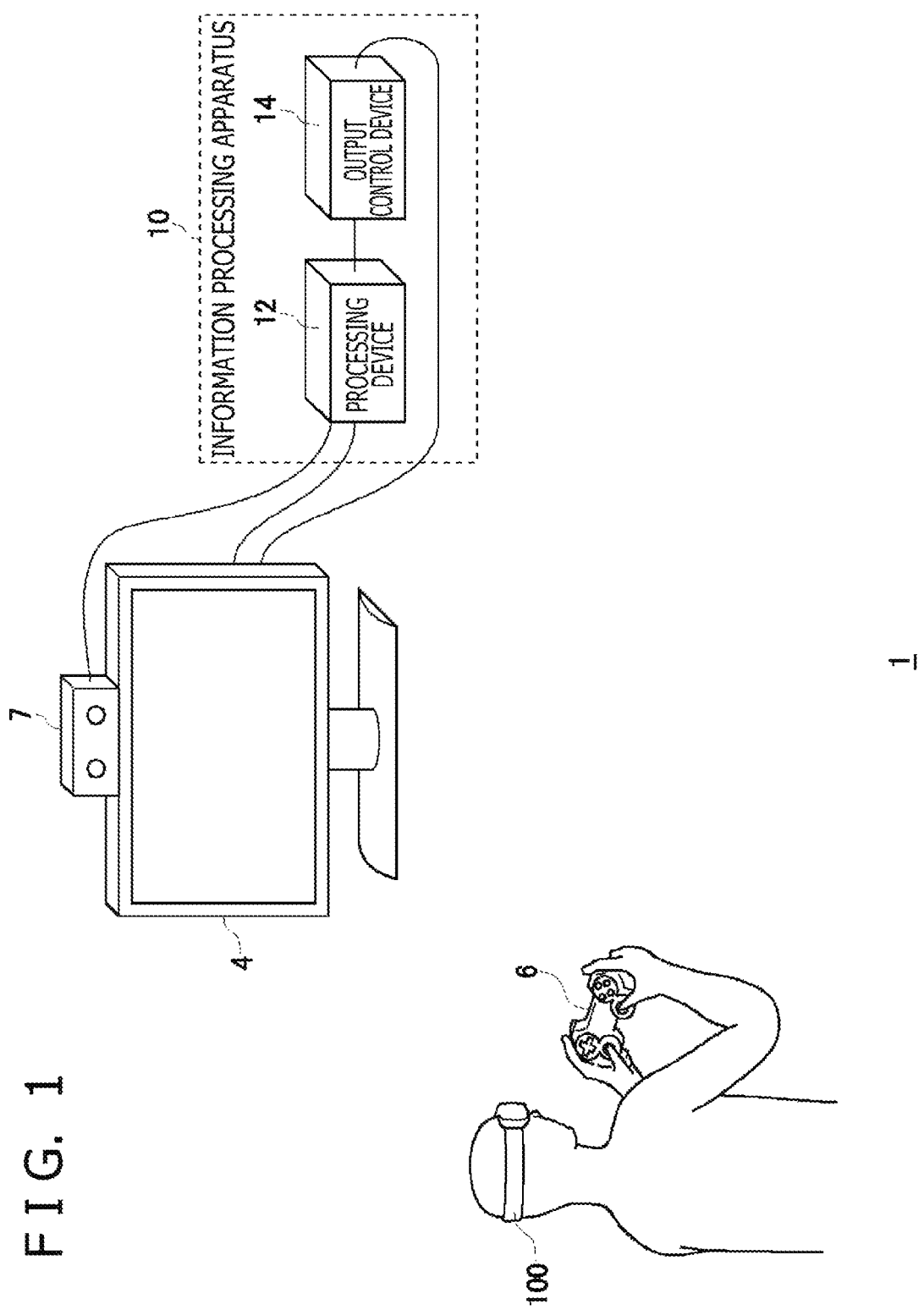
FIG. 1 is a schematic diagram illustrating a typical configuration of an information processing system embodying the present invention.

FIG. 1 illustrates a typical configuration of an information processing system 1 as one embodiment of the present invention. The information processing system 1 includes an information processing apparatus 10, a head-mounted display device (HMD) 100 worn on the head of the user, an input device 6 operated by the user with fingertips, an imaging device 7 for imaging the user wearing the HMD 100, and an output device 4 for displaying images.

In this embodiment, the information processing apparatus 10 includes a processing device 12 and an output control device 14. The processing device 12 is a terminal device that executes diverse applications including games in response to operation information coming from the input device 6 operated by the user. The processing device 12 and the input device 6 may be connected with each other by cable or by known wireless communication technology. The output control device 14 is a processing unit that outputs image data to the HMD 100. The output control device 14 and the HMD 100 may be connected with each other by cable or by known wireless communication technology.

The imaging device 7 captures an image of the user wearing the HMD 100 and feeds the captured image to the processing device 12. The imaging device 7 may be a stereo camera. As will be discussed later, the HMD 100 is furnished with markers (light-emitting diodes (LEDs) for tracking) permitting tracking of the user's head. In accordance with the captured marker positions, the processing device 12 detects the movement of the HMD 100. The HMD 100 is further provided with attitude sensors (an acceleration sensor and a gyro sensor). The processing device 12 acquires from the HMD 100 sensor information detected by the attitude sensors, implementing a highly precise tracking process with the joint use of the sensor information and captured marker images.

Installation of the output device 4 is not mandatory for the information processing system 1 because the user views images displayed on the HMD 100. Still, the output control device 14 or the processing device 12 may cause the output device 4 to output the same image as that displayed on the HMD 100. This allows another user to view on the output device 4 the image being watched by the user on the HMD 100. As will be described later, the image displayed on the HMD 100 is corrected for the distortion of optical lenses. This requires getting the output device 4 to output an image not corrected for the distortion.

In the information processing system 1, the processing device 12, output device 4, input device 6, and imaging device 7 may constitute a conventional game system. In this case, the processing device 12 may be a game device that executes applications such as video games, and the input device 6 may be a game controller, a keyboard, a mouse, a joystick, or some other suitable device for supplying the processing device 12 with the operation information from the user. Supplementing this game system with the output control device 14 and the HMD 100 as additional components makes up the information processing system 1 that executes virtual reality (VR) applications.

The function of the output control device 14 may be incorporated in the processing device 12 as part of the functions of VR applications. That is, the information processing apparatus 10 may be formed by the processing device 12 alone or by the processing device 12 and the output control device 14. In the description that follows, the function of the processing device 12 and that of the output control device 14 necessary for implementing VR applications will be explained collectively as functions of the information processing apparatus 10.

The information processing apparatus 10 generates image data to be displayed on the HMD 100. In this embodiment, the information processing apparatus 10 prepares an omnidirectional, 360-degree panoramic image captured by an omnidirectional camera, and causes the HMD 100 to display an image generated on the basis of a visual line direction determined by the attitude of the HMD 100 worn on the user's head. The content of display may be a still image or a moving image. The display content is not limited to actually captured images; the content may also be images rendered in real time by a game application.

The HMD 100 is a display device that is worn on the user's head and displays images through optical lenses on a display panel positioned in front of the user's eyes. The HMD 100 displays a left-eye image on the left half of the display panel and a right-eye image on the right half of the display panel in a manner independent of each other. These images constitute parallax images viewed from the right and left viewpoints. When displayed on the right-half and left-half portions of the display panel, the parallax images make up a stereoscopic image. Because the user views the display panel through optical lenses, the information processing apparatus 10 supplies the HMD 100 with the image data corrected beforehand for the optical distortion of the lenses. In the information processing apparatus 10, the optical distortion correcting process may be performed by the processing device 12 or by the output control device 14.

Figure 2:
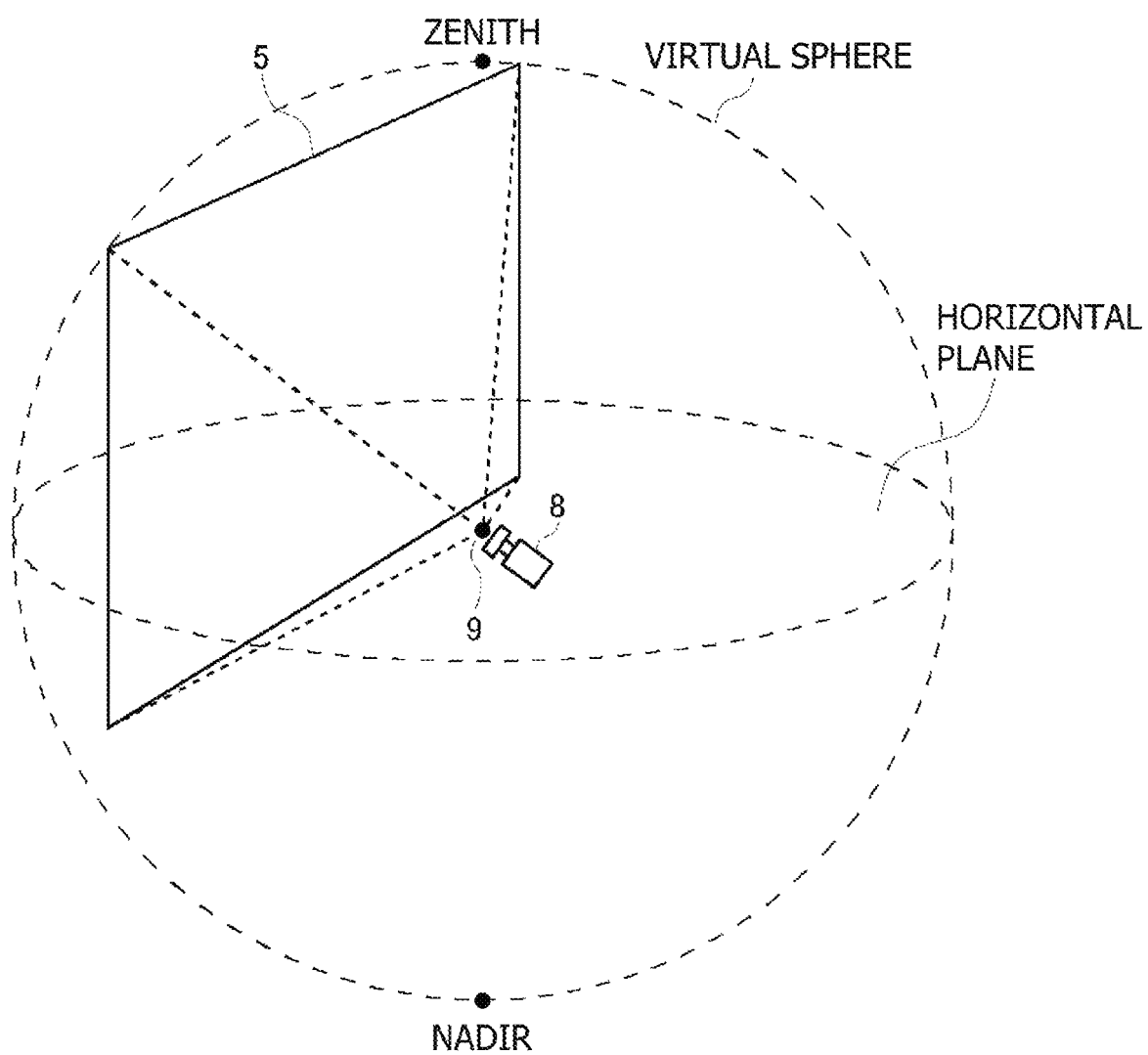
FIG. 2 is an explanatory diagram explaining a rendering process performed by an information processing apparatus.

FIG. 2 is an explanatory diagram explaining a rendering process performed by the information processing apparatus 10. For VR application of this embodiment, a virtual environment is provided in such a manner that the user feels as if he or she is at the center of a sphere and that the image visible to the user is varied when his or her visual line direction is changed. A content image constituting the image material is pasted on the inner circumferential surface of a virtual sphere centering on a center point 9 at which the user is positioned. The content image is an omnidirectional, 360-degree panoramic image captured by an omnidirectional camera. This content image is pasted on the inner circumferential surface of the virtual sphere in such a manner that the zenith and nadir positions of the image coincide with those of the virtual sphere. When the zenith and nadir positions of the user's real world are thus aligned with those of the visual world offered to the HMD 100, it permits implementation of a VR application that reproduces the realistic visual world.

The information processing apparatus 10 detects the rotation angle and inclination of the user's head (HMD 100 in reality) by performing a tracking process on the user's head position. The rotation angle of the HMD 100 is defined relative to a horizontal reference direction. For example, the direction in which the HMD 100 is oriented when switched on may be established as the reference direction. The inclination of the HMD 100 is defined as an inclination angle relative to a horizontal plane. Existing techniques may be used to implement the head tracking process. The information processing apparatus 10 may detect the rotation angle and inclination of the HMD 100 solely from the sensor information detected by the attitude sensors of the HMD 100. The information processing apparatus 10 may also detect the rotation angle and inclination of the HMD 100 with higher accuracy by analyzing images of the markers (tracking LEDs) on the HMD 100 captured by the imaging device 7.

The information processing apparatus 10 determines the attitude of a virtual camera 8 in the virtual sphere in accordance with the detected rotation angle and inclination of the HMD 100. The virtual camera 8 is arranged to image the inner circumferential surface of the virtual sphere from its center point 9. The information processing apparatus 10 aligns the detected rotation angle and inclination with the rotation angle and inclination of the optical axis of the virtual camera 8 in the virtual sphere. The information processing apparatus 10 acquires a captured image 5 from the virtual camera 8, i.e., performs a rendering process, corrects the image for the optical distortion of the optical lenses, and feeds the image data to the HMD 100. Whereas FIG. 2 illustrates a single virtual camera 8, a right-eye virtual camera 8 and a left-eye virtual camera 8 are in reality provided to generate their respective image data.

Figure 3:
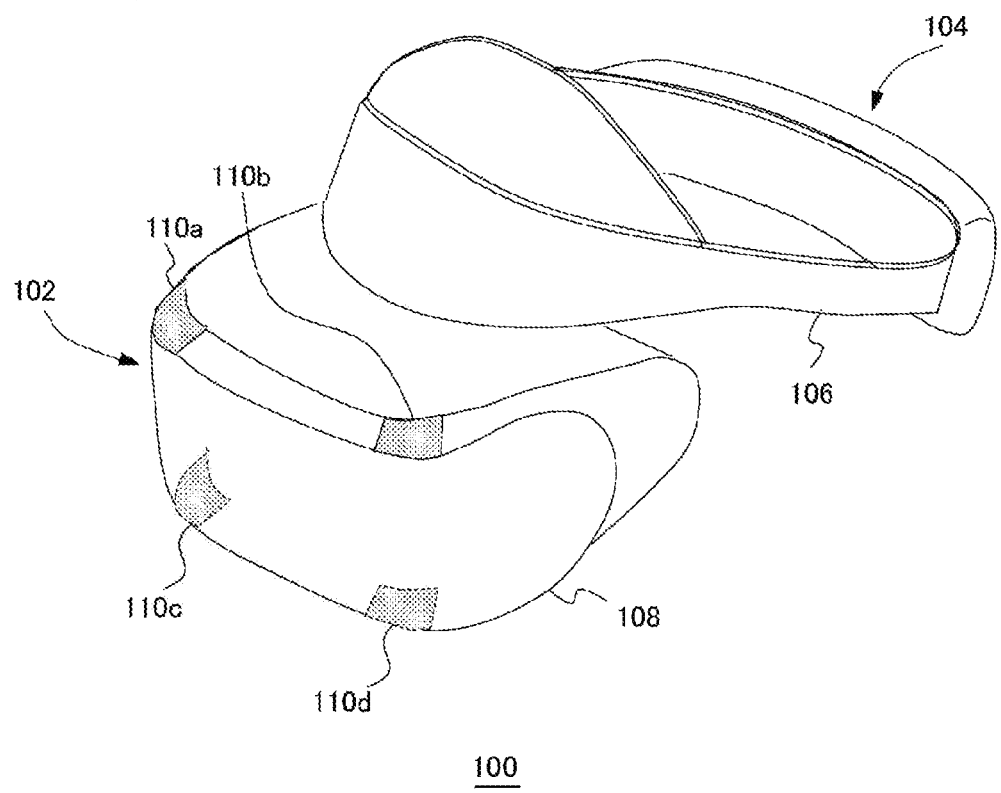
FIG. 3 is a schematic diagram illustrating a typical external shape of an HMD.

FIG. 3 illustrates a typical external shape of the HMD 100. In this example, the HMD 100 is made up of an output mechanism section 102 and a wearing mechanism section 104. The wearing mechanism section 104 includes a wearing band 106 worn by the user to fasten the HMD 100 around the head. The wearing band 106 uses a material or a structure that allows the band to be adjusted in length to fit around the user's head.

An output mechanism section 102 includes a housing 108 shaped to cover the right and left eyes of the user wearing the HMD 100. Inside the housing 108 includes a display panel facing straight at the eyes in rearing the HMD. The display panel is a display section that presents the VR image to the user's visual field. The display panel may be a known display device, such as a liquid crystal panel or an organic electroluminescent (EL) panel. Also inside the housing 108 are a pair of right and left optical lenses interposed between the display panel and the eyes of the user wearing the HMD 100, the lenses serving to magnify the user's viewing angle. The HMD 100 may be further equipped with speakers or earphones that correspond to the positions of the user's ears when the user wears the HMD 100.

The external surface of the enclosure 108 is equipped with light-emitting markers 110a, 110b, 110c and 110d. Although tracking LEDs make up the light-emitting markers 110 in this example, other suitable markers may be used instead. In any case, the markers need only be imaged by the imaging device 7 in a manner permitting image analysis by the information processing apparatus 10. Whereas the light-emitting markers 110 are not limited in number and in arrangement, their number and their arrangement need to be such as to permit detection of the attitude of the HMD 100 (its rotation angle and inclination). In the illustration, the markers are arranged at four corners on the front of the enclosure 108. The light-emitting markers 110 may be additionally arranged on the sides and the rear of the wearing band 106. These additional markers may be imaged if the user turns his or her back to the imaging device 7.

The HMD 100 may be connected with the information processing apparatus 10 by cable or by known wireless communication technology. The HMD 100 transmits sensor information detected by the attitude sensors to the information processing apparatus 10. The HMD 100 also receives image data generated by the information processing apparatus 10 and displays the received data on the display panel.

Whereas the HMD 100 illustrated in FIG. 3 is an immersive (non-transmissive) display device that fully covers both eyes, the HMD 100 may also be a transmissive display device. In terms of shape, the HMD 100 may be of hat type as illustrated but may also be of spectacle type.

Figure 4:
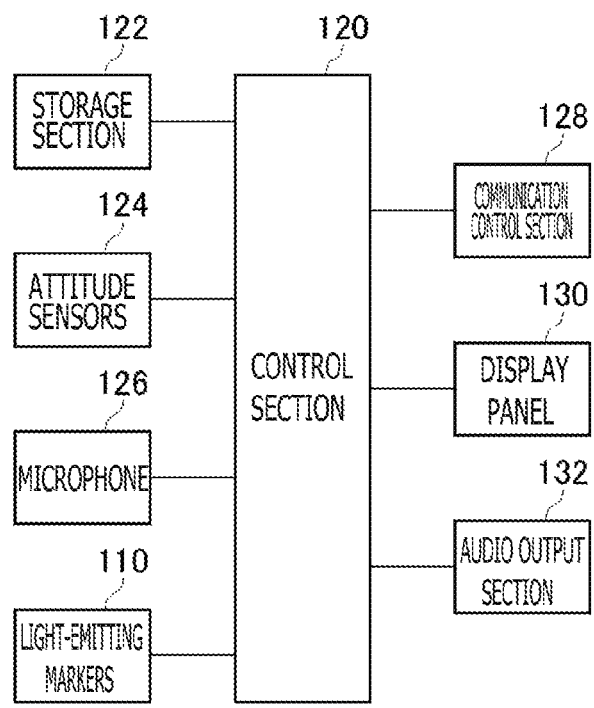
FIG. 4 is a block diagram illustrating functional blocks of the HMD.

FIG. 4 illustrates functional blocks of the HMD 100. A control section 120 is a main processor which processes diverse data such as image data, audio data, sensor information, and instructions and which outputs what is processed. A storage section 122 temporarily stores the data and instructions processed by the control section 120. Attitude sensors 124 detect attitude information about the HMD 100 such as its rotation angle and inclination. The attitude sensors 124 include at least a three-axis acceleration sensor and a three-axis gyro sensor. A microphone 126 converts the user's voice to an electrical signal. The light-emitting markers 110 are multiple LEDs attached to the wearing band 106 and enclosure 108 of the HMD 100.

A communication control section 128 transmits the data input from the control section 120 to an external information processing apparatus 10 by wired or wireless communication via a network adapter or an antenna. The communication control section 128 further receives data from the information processing apparatus 10 by wired or wireless communication via the network adapter or the antenna, and outputs the received data to the control section 120.

Upon receipt of image data and audio data from the information processing apparatus 10, the control section 120 feeds the received data to a display panel 130 for display and to an audio output section 132 for audio output. The control section 120 further causes the communication control section 128 to transmit the sensor information from the attitude sensors 124 and the audio data form the microphone 126 to the information processing apparatus 10.

Figure 5:
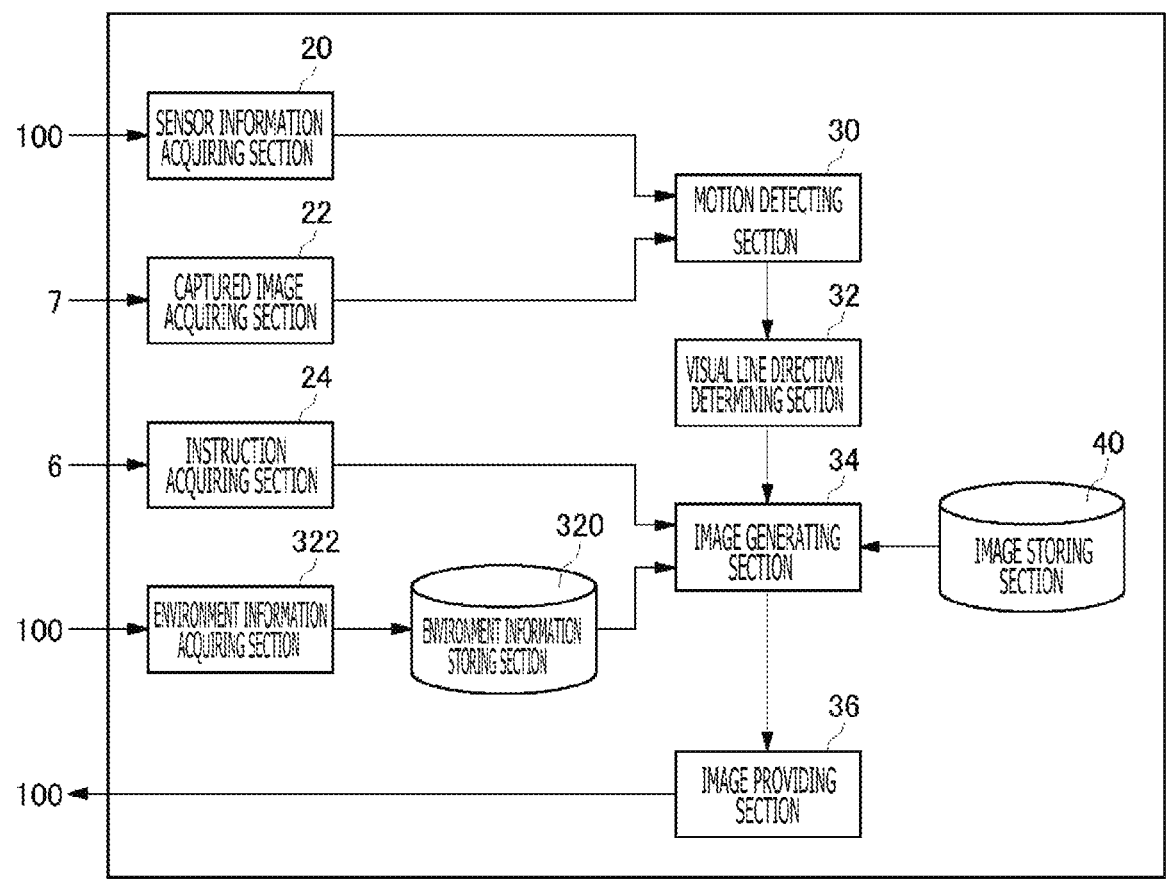
FIG. 5 is a block diagram illustrating functional blocks of the information processing apparatus.

FIG. 5 illustrates functional blocks of the information processing apparatus 10. The information processing apparatus 10 includes a sensor information acquiring section 20, a captured image acquiring section 22, an instruction acquiring section 24, and an environment information acquiring section 322, the sections serving as an input interface to the outside. The sensor information acquiring section 20 acquires the sensor information at predetermined intervals from the attitude sensors 124 of the HMD 100. The captured image acquiring section 22 acquires captured images from the imaging device 7 imaging the HMD 100 at predetermined intervals. For example, the imaging device 7 captures images at intervals of $1/120$ second, while the captured image acquiring section 22 acquires captured images at intervals of $1/120$ second. The instruction acquiring section 24 acquires instructions input by the user from the input device 6.

The information processing apparatus 10 further includes a motion detecting section 30, a visual line direction determining section 32, an image generating section 34, and an image providing section 36. The motion detecting section 30 detects the attitude of the HMD 100 worn on the user's head. The visual line direction determining section 32 determines the visual line direction in accordance with the attitude of the HMD 100 detected by the motion detecting section 30. The image generating section 34 generates images in accordance with the detected attitude of the HMD 100. Specifically, the image generating section 34 generates images based on the visual line direction determined by the visual line direction determining section 32. The image providing section 36 provides the generated image to the HMD 100.

The components indicated in FIG. 5 as functional blocks for carrying out diverse processes may each be configured by a circuit block, a memory, or some other large-scale integrated (LSI) circuit in terms of hardware, or by a program loaded into a memory in terms of software. Thus it will be understood by those skilled in the art that these functional blocks are realized by hardware alone, by software alone, or by a combination of both in diverse forms and are not limited to any of such forms.

An image storing section 40 stores 360-degree panoramic image data captured beforehand. The image storing section 40 may store multiple content images. The content images may be still images or moving images. The image storing section 40 in the embodiment stores omnidirectional panoramic image data. The information processing apparatus 10 provides the user wearing the HMD 100 with an omnidirectional panoramic image. When the user turns his or her head to the right or to the left (the user may turn his or her entire body right or left) to turn his or her horizontal visual line right or left, the display panel 130 of the HMD 100 displays a panoramic image in the right or left direction. When the user tilts his or her head upward or downward to incline the visual line vertically, the display panel 130 of the HMD 100 displays a panoramic image in the upward or downward direction.

An environment information storing section 320 stores information about the environment for image display on the HMD 100 (the information may be referred to as "display environment information" hereunder). The display environment information includes the screen resolution of the display panel 130 of the HMD 100 and a refresh rate (i.e., vertical scanning frequency) of the display panel 130. The screen resolution is information that includes the number of horizontal and vertical pixels of the display panel 130. That is, the screen resolution is information that identifies the number of scanning lines on the display panel 130. Although the display environment information may be determined fixedly by a VR application executed by the information processing apparatus 10, this embodiment obtains the information automatically from the HMD 100.

The environment information acquiring section 322 acquires the display environment information about the HMD 100 from the HMD 100. For example, when the information processing apparatus 10 starts a VR application, the environment information acquiring section 322 requests the HMD 100 to provide the display environment information. The environment information acquiring section 322 then acquires the display environment information automatically from the HMD 100 and stores the acquired information into the environment information storing section 320. In a variation, the environment information acquiring section 322 may hold beforehand the corresponding relations between the types of the HMDs 100 or the display panels 130 and the display environment information, detect automatically the type of the HMD 100 or of the display panel 130 based on the stored corresponding relations, and store the display environment information corresponding to the detected type into the environment information storing section 320. The environment information acquiring section 322 may further provide a screen through which the user may input the display environment information about the HMD 100. The environment information acquiring section 322 may acquire the display environment information input by the user via the input device 6 and store the acquired information into the environment information storing section 320.

Figure 6:
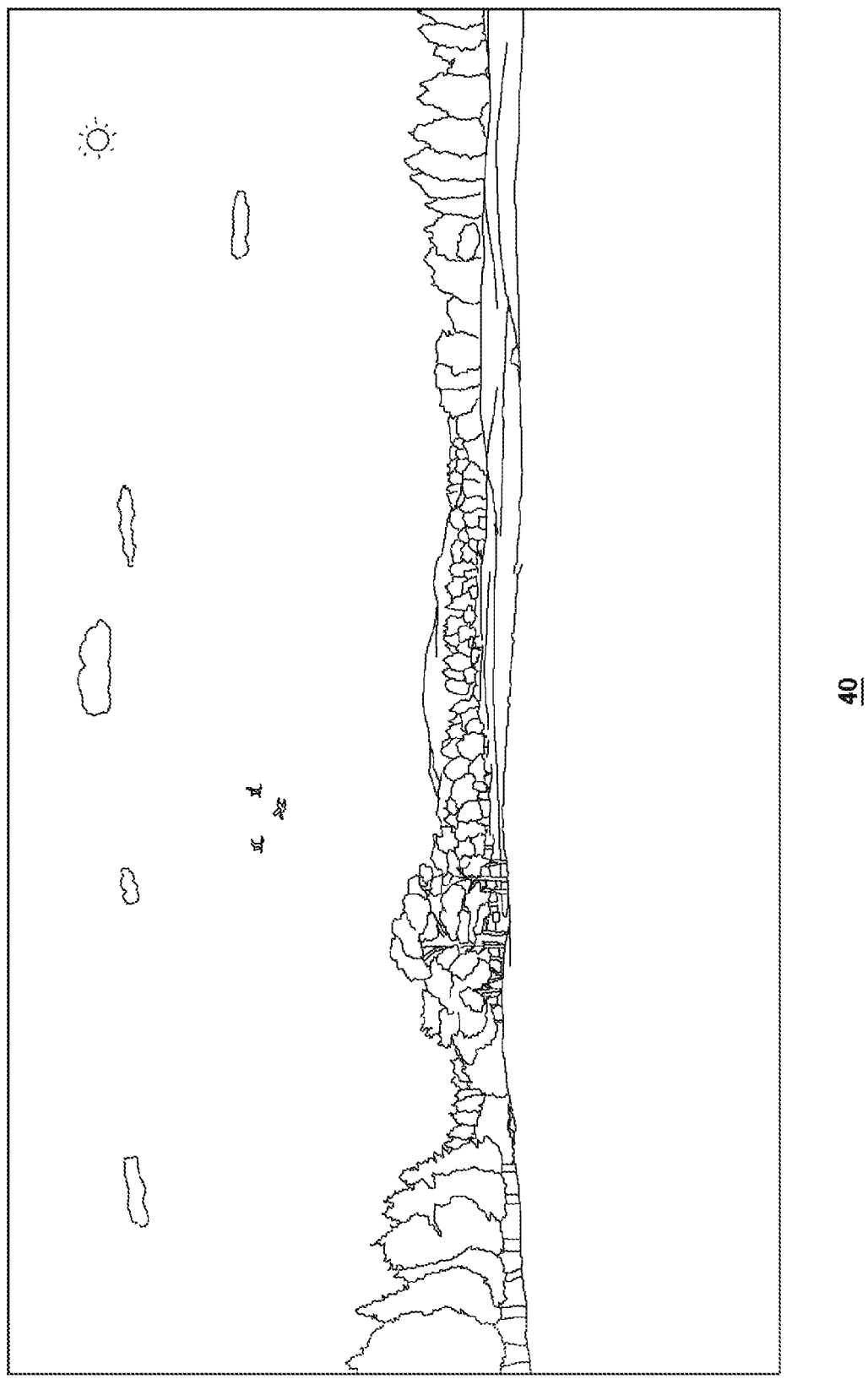
FIG. 6 is an explanatory diagram explaining panoramic image data stored in an image storing section.

FIG. 6 is an explanatory diagram explaining panoramic image data to be stored in the image storing section 40. For purpose of explanation, FIG. 6 illustrates part of an omnidirectional panoramic image, and omits portions of the image from the horizontal plane downward as well as portions of the image in the right and left directions. As discussed above with reference to FIG. 2, the display panel 130 of the HMD 100 displays an image formed by rendering the panoramic image pasted on the inner circumferential surface of the virtual sphere. When the user changes his or her visual line direction by moving the rotation angle and inclination of the HMD 100, the panoramic image being displayed is moved in keeping with the visual line direction.

The communication control section 128 of the HMD 100 transmits to the information processing apparatus 10 the sensor information acquired at predetermined intervals by the attitude sensors 124. The imaging device 7 images the HMD 100 at predetermined intervals and transmits the captured images to the information processing apparatus 10. Referring to FIG. 5, the sensor information acquiring section 20 acquires the sensor information from the attitude sensors 124 and feeds the acquired information to the motion detecting section 30. The captured image acquiring section 22 acquires a captured image and feeds it to the motion detecting section 30.

In detecting the attitude of the HMD 100, the motion detecting section 30 performs the head tracking process to detect the attitude of the user's head wearing the HMD 100.

The head tracking process is carried out to synchronize the field of view displayed on the display panel 130 of the HMD 100 with the attitude of the user's head. The head tracking process of the embodiment involves detecting the rotation angle of the HMD 100 relative to a horizontal reference direction and the inclination angle of the HMD 100 relative to a horizontal plane. The horizontal reference direction may be established as the direction in which the HMD 100 is oriented when switched on, for example.

The head tracking process may be performed using existing techniques, with the motion detecting section 30 detecting the rotation angle of the HMD 100 relative to the horizontal reference direction and the inclination angle of the HMD 100 relative to the horizontal plane solely from the sensor information given by the attitude sensors 124. Preferably, the accuracy of the detection may be enhanced by the additional use of captured images of the light-emitting markers 110 for tracking purposes. The motion detecting section 30 detects the rotation angle and the inclination angle at predetermined intervals. For example, if the image fed to the HMD 100 is captured at 120 frames per second (fps), the motion detecting section 30 may preferably perform its detecting process at intervals of $1/120$ second.

The visual line direction determining section 32 determines the visual line direction in accordance with the attitude of the HMD 100 detected by the motion detecting section 30. The visual line direction thus determined is both the visual line direction of the user and that (optical axis direction) of the virtual camera 8 arranged at the center point 9 of the virtual sphere (see FIG. 2). Here, the visual line direction determining section 32 may determine the rotation angle and inclination angle detected by the motion detecting section 30 directly as representative of the visual line direction (optical axis direction) of the virtual camera 8. The visual line direction determining section 32 may also determine the visual line direction of the virtual camera 8 by carrying out some suitable correcting process. If the motion detecting section 30 is not supplied with stable sensor information, as when the sensor information is contaminated with noise, the motion detecting section 30 might detect vibrating movements despite the user's head being stationary. In such a case, the visual line direction determining section 32 may determine the visual line direction by smoothing out the movements detected by the motion detecting section 30.

Incidentally, the field of view of the humans is vertically asymmetrical; the view under the visual line is slightly wider than the view thereabove. Thus the visual line direction determining section 32 may determine the visual line direction of the virtual camera 8 by slightly tilting down the inclination angle detected by the motion detecting section 30.

The image generating section 34 generates an image in accordance with the attitude of the HMD 100 detected by the motion detecting section 30. Specifically, the image generating section 34 generates an image based on the visual line direction of the virtual camera 8 determined by the visual line direction determining section 32. The image generating section 34 determines the right-eye and left-eye visual fields defined by the visual line direction, before generating a right-eye image and a left-eye image through rendering. At this point, the image generating section 34 generates a panoramic image corrected for the distortion of the image light coming from the display panel and passing through the optical lenses.

The HMD 100 of the embodiment provides the user with the visual field at an angle of approximately 100 degrees to the horizontal direction and at an angle of approximately 100 degrees to the vertical direction. Referring to FIG. 2, the captured image 5 is obtained at an angle of view of approximately 100 degrees to the horizontal direction and at an angle of view of approximately 100 degrees to the vertical direction inside the virtual sphere. The captured image 5 is displayed on the display panel 130 of the HMD 100. As mentioned above, the visual field of the humans is slightly wider under the visual line than thereabove. For this reason, the optical lenses and the display panel 130 of the HMD 100 may be tilted 5 degrees in a direction opposite to the eye position. The optical lenses and the display panel 130 may thus be arranged to implement a vertical field of view at an upward angle of 45 degrees and at a downward angle of 55 degrees.

Figure 7:
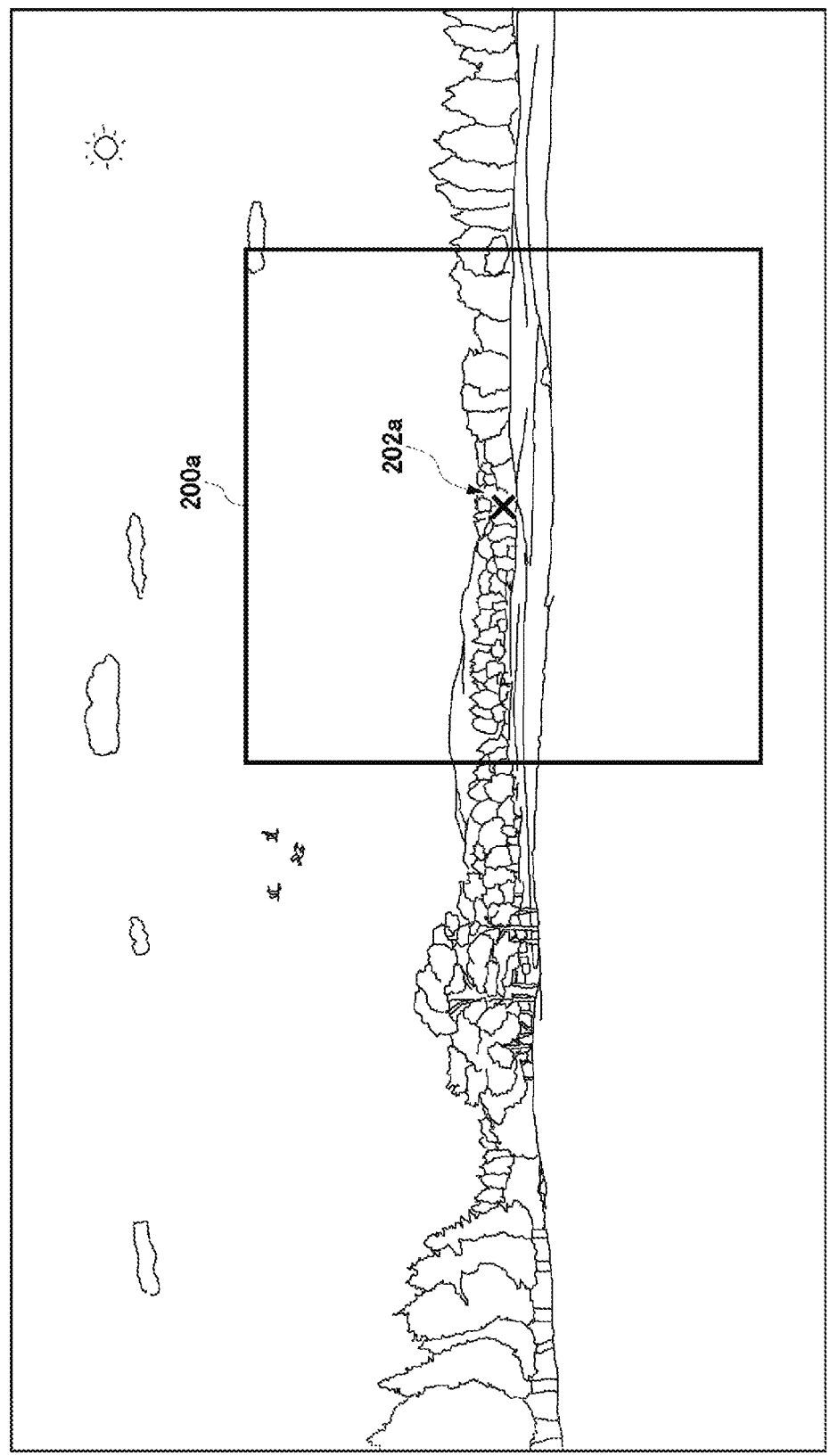
FIG. 7 is a schematic diagram illustrating a display image.

FIG. 7 illustrates a display image 200a generated by the image generating section 34. In the drawings referenced below, the display image will be presented as an image cut out of the panoramic image for the ease of understanding the positional relation of the display image within the entire panoramic image.

The image generating section 34 generates an image based on a visual line direction 202a determined by the visual line direction determining section 32. In practice, the image generating section 34 generates a right-eye display image and a left-eye display separately through rendering as different images each containing a parallax. In the description that follows however, no mention will be made of the images being generated separately for both eyes. The image providing section 36 provides the HMD 100 with the display image 200a generated by the image generating section 34. The control section 120 in the HMD 100 causes the display panel 130 to display the display image 200a. The user is then able to view the display image 200a displayed on the display panel 130.

Figure 8:
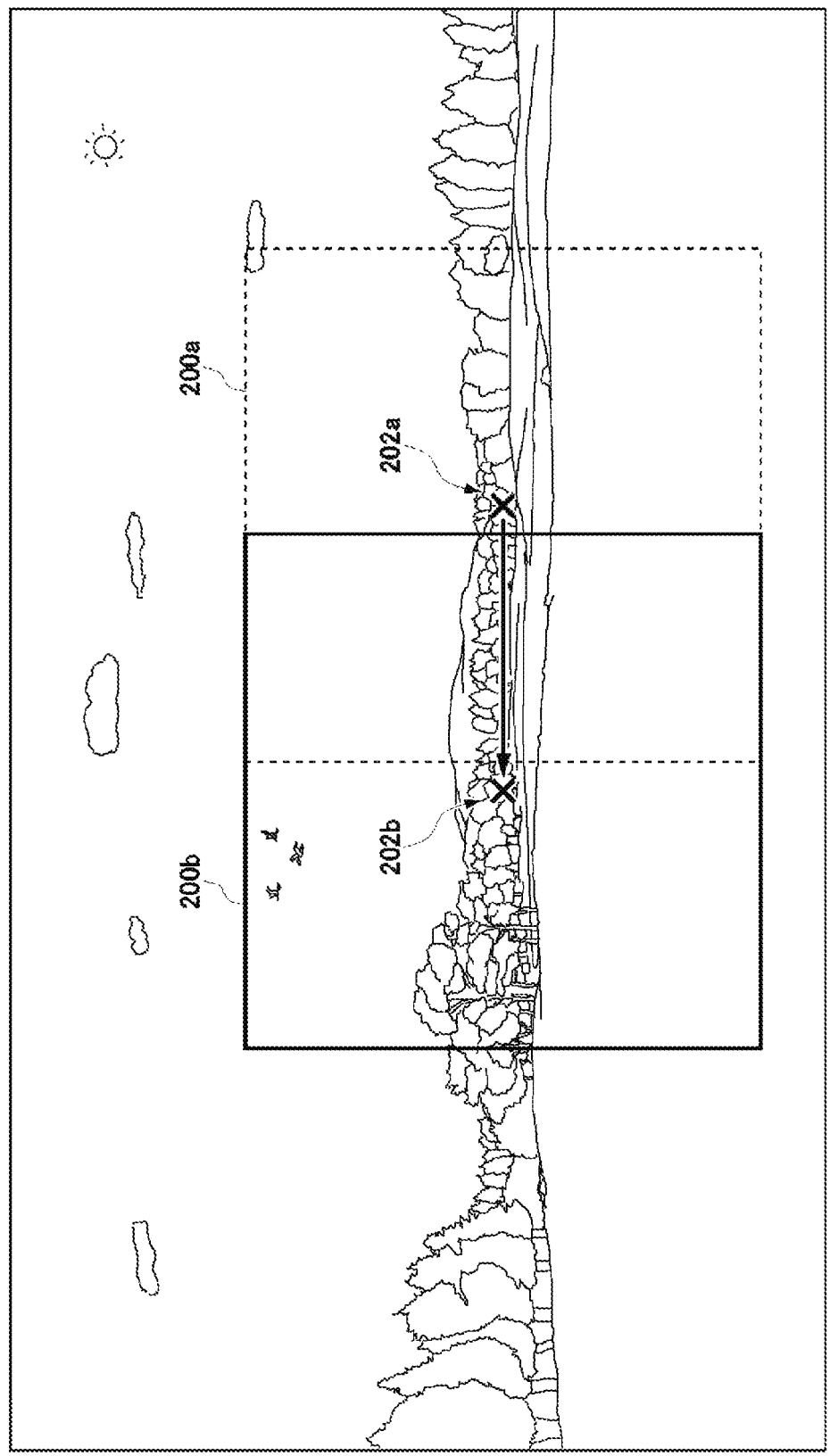
FIG. 8 is a schematic diagram illustrating another display image.

FIG. 8 illustrates a display image 200b generated by the image generating section 34. The visual line direction determining section 32 determines the visual line direction in accordance with the attitude of the HMD 100. The image generating section 34 generates the image based on the visual line direction thus determined. This example indicates that the user has turned his or her head to the left, with the visual line changed continuously from a visual line direction 202a to a visual line direction 202b. Here, the user has turned his or her head approximately 60 degrees to the left. The turning motion causes the image generating section 34 to generate images at intervals of $1/120$ second in a manner turning the panoramic image continuously to the left starting from the display image 200a. The image providing section 36 provides the HMD 100 with the generated images at intervals of $1/120$ second.

Figure 9:
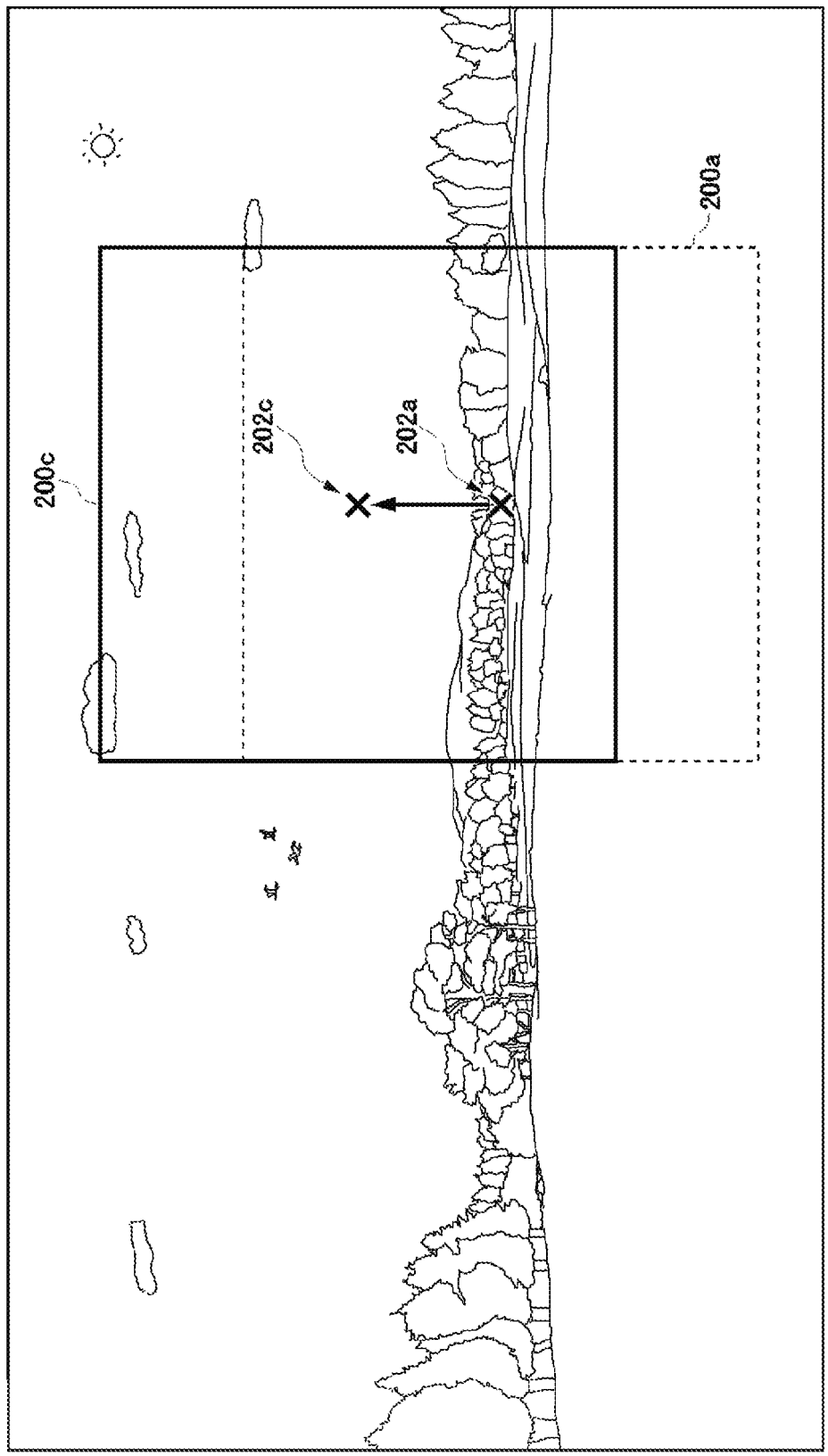
FIG. 9 is a schematic diagram illustrating another display image.

FIG. 9 illustrates a display image 200c generated by the image generating section 34. The visual line direction determining section 32 determines the visual line direction in accordance with the attitude of the HMD 100. The image generating section 34 generates the image based on the visual line direction thus determined. This example indicates that the user has tilted up his or her head from the state in which the display image 200a is displayed on the display panel 130, with the visual line changed continuously from the visual line direction 202a to a visual line direction 202c. Here, the user has tilted up his or her head approximately 30 degrees. The tilting motion causes the image generating section 34 to generate images at intervals of $1/120$ second in a manner moving the panoramic image continuously upward starting from the display image 200*a*. The image providing section 36 provides the HMD 100 with the generated images at intervals of ¹⁄₁₂₀ second.

As described above, the user varies the visual line direction by moving his or her head. The information processing apparatus 10 provides the HMD 100 with a panoramic image given in a desired direction so that the HMD 100 will display the image on the display panel 130. The manner in which the visual line direction is varied by moving the head is the same as in the real world. What is virtually brought about thus accords with the user's sensation of the real world. Where the HMD 100 provides the user with a wide viewing angle, the user's sense of immersion in the panoramic image is further enhanced.

Figure 10:
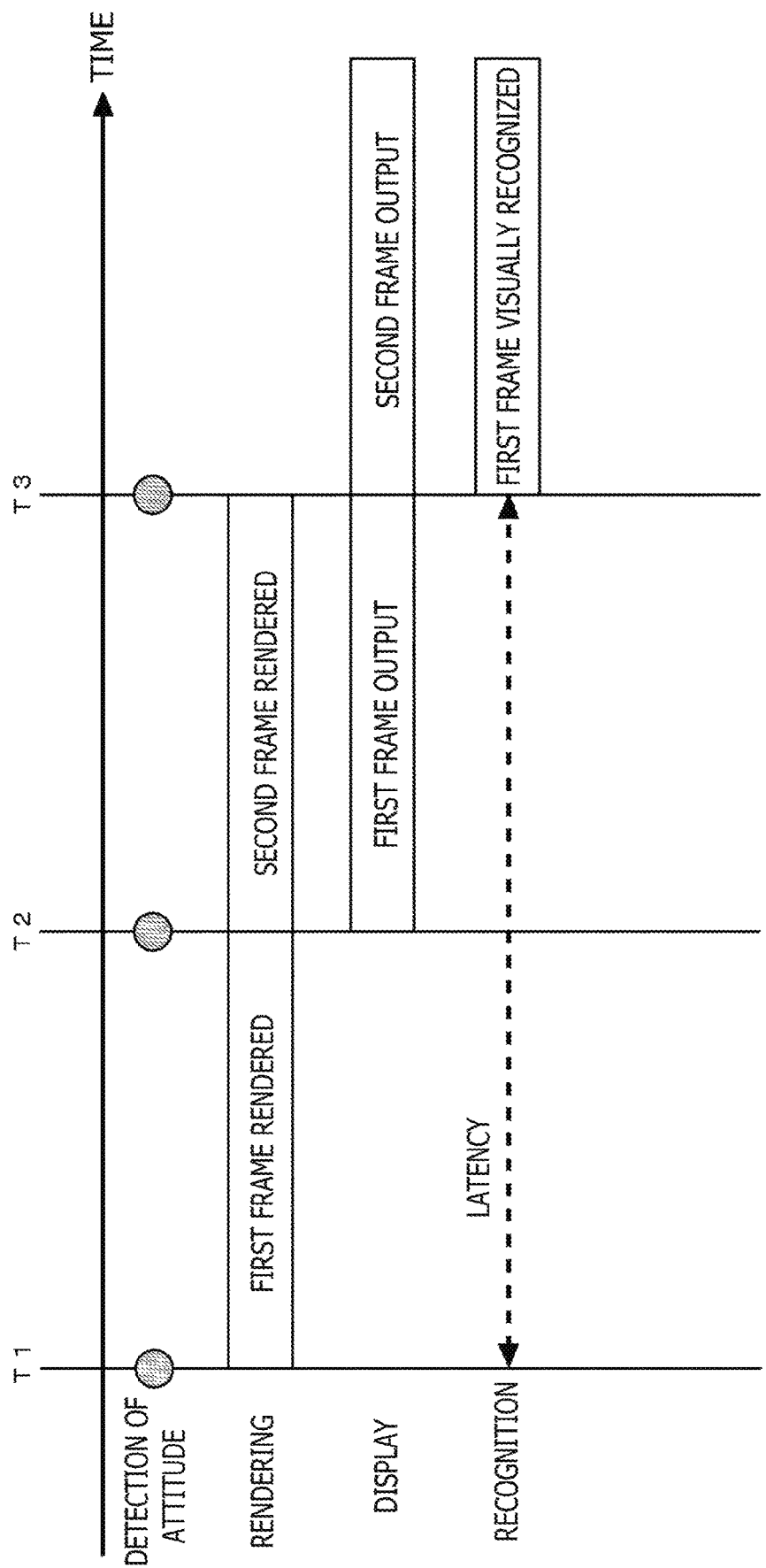
FIG. 10 is a schematic diagram schematically illustrating a flow of image generation and display performed by an ordinary HMD system.

What follows is an explanation of "reprojection" performed by the embodiment. Reprojection is an image transformation process that permits smooth screen transition of the HMD and alleviates a feeling of discomfort of the user viewing the display image. FIG. 10 schematically illustrates a flow of image generation ad display performed by an ordinary HMD system. In FIGS. 10, T1, T2 and T3 denote vertical synchronization (VSYNC) timings of the display panel 130 of the HMD 100.

A first frame is generated on the basis of the attitude of the HMD detected at the timing T1. In parallel with the first frame being output to the display panel 130 starting from the timing T2, a second frame is generated on the basis of the attitude of the HMD detected at the timing T2. In FIG. 10, the user is supposed to recognize the first frame at the timing T3 for purpose of simplification. In this case, there is a relatively long latency (T1 to T3) from the time the attitude of the HMD is detected until the user visually recognizes the image based on the detected attitude. As a result, the user may experience a feeling of discomfort in viewing a display image inconsistent with the current attitude of the HMD.

Figure 11:
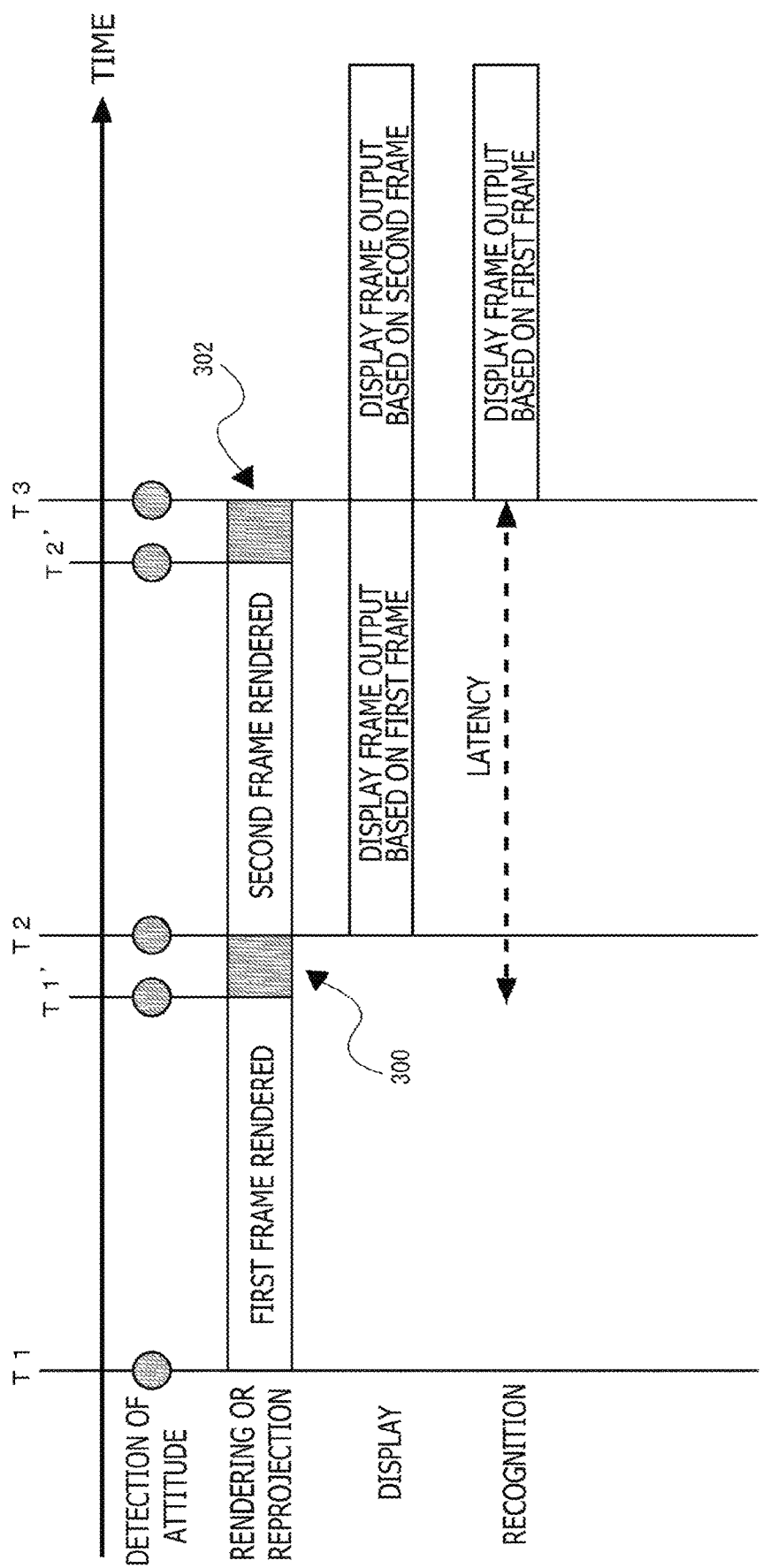
FIG. 11 is a schematic diagram schematically illustrating a flow of image generation and display involving reprojection.

FIG. 11 schematically illustrates a flow of image generation and display involving reprojection. In FIG. 11, a reprojection period 300 is provided between a timing T1' and the timing T2. Another reprojection period 302 is provided between a timing T2' and the timing T3. The image generating section 34 performs the reprojection process on the first frame based on the attitude of the HMD detected at the timing T1'.

Specifically, a predetermined transformation process such as affine transformation is carried out on the first frame on the basis of the difference between an attitude T1 (visual line direction) detected at the timing T1 and an attitude T1' (visual line direction) detected at the timing T1'. Based on the first frame, a display frame is generated in a manner reflecting the attitude T1'. Because reprojection is the transformation process performed on the rendered image and not aimed at executing a new rendering process, the reprojection period is relatively short.

Starting from the timing T2, a display frame following the reprojection process performed on the first frame is output. The user recognizes the display frame at the timing T3. In this manner, the latency is reduced between the time the attitude of the HMD is detected and the time the user visually recognizes the image based on the detected attitude (T1' to T3). As a result of this, an image more consistent with the current attitude of the HMD is displayed. This alleviates the user's feeling of discomfort in viewing the display image.

Figure 12:
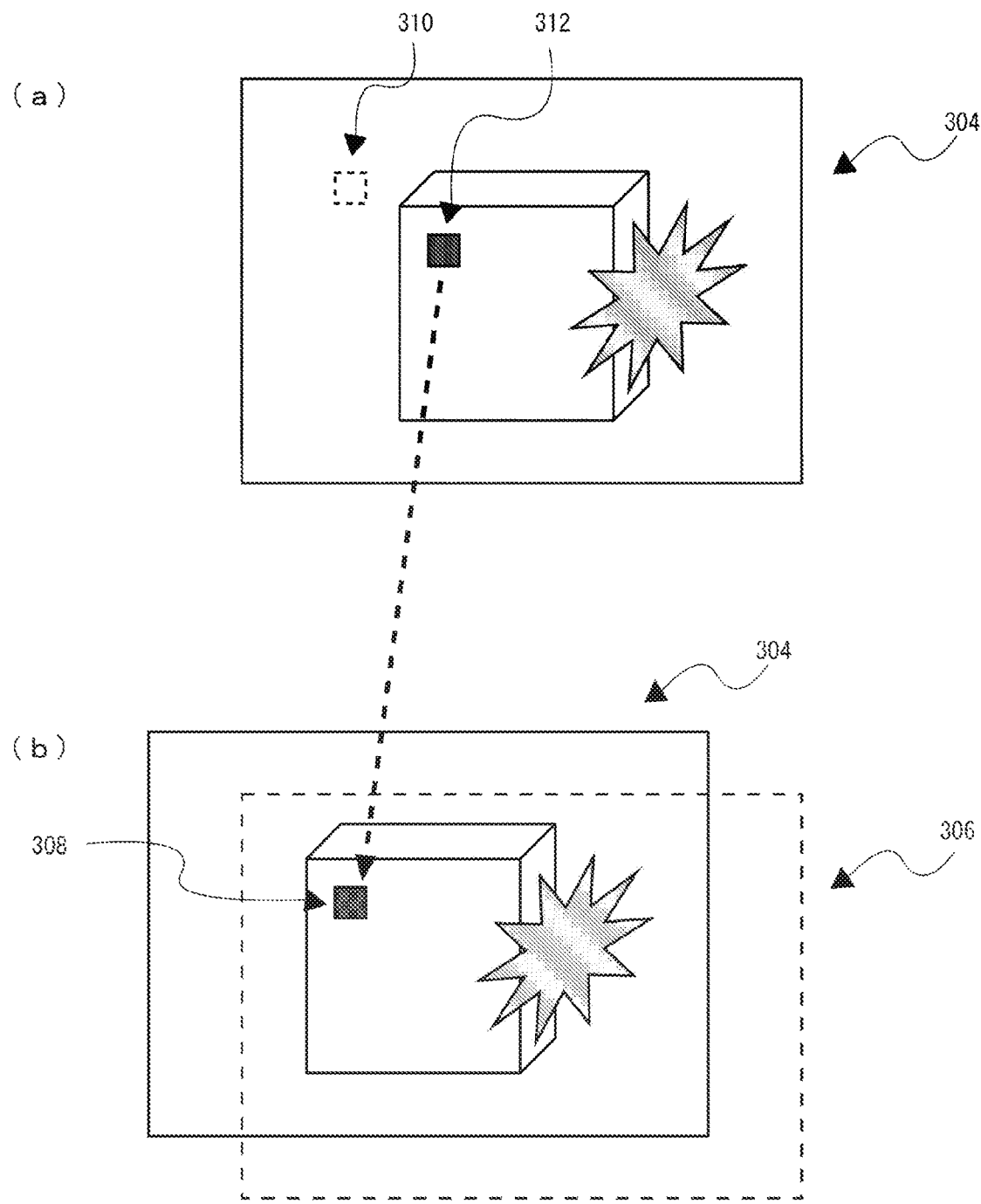
FIG. 12 is a set of schematic diagrams illustrating typical images before and after reprojection.

FIG. 12 is a set of schematic diagrams illustrating typical images before and after reprojection. Subfigure 12(*a*) illustrates a typical reference image 304 targeted for reprojection. The reference image 304 is an image rendered on the basis of the attitude of the HMD (user's visual line direction) identified at a first point in time. This is the original image prior to transformation by reprojection. For example, the first point in time corresponds to T1 in FIG. 11, with the reference image 304 corresponding to the first frame in FIG. 11.

Subfigure 12(*b*) illustrates a typical display image 306 generated by reprojection. The display image 306 is an image following reprojection based on the attitude of the HMD identified at a second point in time after the first point in time. For example, the second point in time corresponds to T1' in FIG. 11, with the display image 306 corresponding to the first frame in FIG. 11. The reprojection process involves identifying the pixel of the reference image 304 that corresponds to each of the pixels of the display image 306 (the pixel may be referred to as the "corresponding pixel" hereunder). The pixel value of each corresponding pixel is set as the pixel value of each of the pixels in the display image 306. The corresponding pixel in the reference image 304 that corresponds to a specific pixel in the display image 306 may be considered the source of the pixel value for that specific pixel.

In the examples of Subfigures 12(*a*) and 12(*b*), it is assumed that the user has turned his or her head in the bottom right direction, i.e., that the visual line direction of the HMD is moved in the bottom right direction, between the first point in time and the second point in time. On that assumption, it is necessary to shift the reference image 304 in the top left direction. The image generating section 34 identifies, as the pixel corresponding to a specific pixel 308 in the display image 306, a corresponding pixel 312 positioned in the bottom right of an identically positioned pixel 310 at the identical position (e.g., coordinates) in the image. The image generating section 34 sets the pixel value of the corresponding pixel 312 as the pixel value of the specific pixel 308. In other words, the color information about the corresponding pixel 312 is set for the color information about the specific pixel 308. Identification of the corresponding pixel and setting of the pixel value are carried out on each of the pixels in the display image 306. This generates the display image 306 consistent with the attitude at the second point in time.

The display panel 130 of the HMD 100 in this embodiment displays the pixels in the display image 306 successively from the scanning line at one end of the panel to the scanning line at the other end. Specifically, the pixels are displayed successively from the top scanning line to the bottom scanning line in units of scanning lines. The difference in time between the output on the top scanning line and the output on the bottom scanning line is 8.3 milliseconds (ms) if the frame rate is 120 FPS, or 11.1 ms if the frame rate is 90 FPS. Thus the attitude of the HMD can change from the time one display image 306 starts to be displayed until the display of the display image 306 is completed.

FIG. 13 is a set of schematic diagrams schematically illustrating simplified reprojection. Subfigure 13(*a*) illustrates a typical reference image 304, and Subfigure 13(*b*) illustrates a typical display image 306. The lattices in both Subfigures denote the pixels. In this case, the display image 306 in Subfigure 13(*b*) is generated by the reprojection process that involves shifting the reference image 304 in Subfigure 13(*a*) rightward by two pixels.

If the amount of displacement of all pixels (pixels on each line) is made uniform as illustrated in Subfigure 13(*b*), the pixels positioned on relatively lower lines in the display image 306 are output onto scanning lines lower than the pixels positioned on relatively upper lines. That means the pixels on relatively lower lines are delayed in being displayed on the display panel 130. In other words, the lower the line on which the pixels appear is positioned, the later their display timing becomes. Thus the lower the line in on which the pixels are positioned in the display image 306, the more inconsistent the displayed pixels become with the current attitude of the HMD. In other words, the amount of their shift is insufficient. As a result, from the user's point of view, the lower side of the display image 306 may appear to be distorted in a manner being pulled by a shift in the visual line direction.

FIG. 14 is a set of schematic diagrams schematically illustrating reprojection performed by the embodiment. Subfigure 14(a) illustrates a typical reference image 304, and Subfigure 14(b) illustrates a typical display image 306. The lattices in both Subfigures denote the pixels. As illustrated in Subfigure 14(b), the lower the line on which the pixels are positioned in the display image 306, the greater the amount of their displacement from the reference image 304. In other words, the lower the specific pixel is positioned in the display image 306 (i.e., the lower the scanning line for display), the farther the corresponding pixel corresponding to the specific pixel is positioned in the reference image 304.

For example, it is assumed that the attitude detected at the timing T1' in FIG. 11 is shifted leftward by two units from the attitude detected at the timing T1. In the reprojection example of Subfigure 13(b), all lines are shifted uniformly rightward by two pixels. In the reprojection example of Subfigure 14(b), by contrast, the top line is shifted rightward by one pixel, the middle line by two pixels, and the bottom line by three pixels. In a variation, the top line may be shifted rightward by two pixels, the middle line by three pixels, and the bottom line by four pixels.

In this manner, the difference in output time between the scanning lines on the display panel 130 of the HMD 100 is reflected on the display image 306. This makes it possible to present the user with a virtual space that looks natural from the user's point of view even when the attitude of the HMD 100 keeps changing. For example, when the display image 306 in Subfigure 14(b) is displayed on the display panel 130, the user recognizes as if the reference image 304 in Subfigure 14(a) is displayed.

Figure 15:
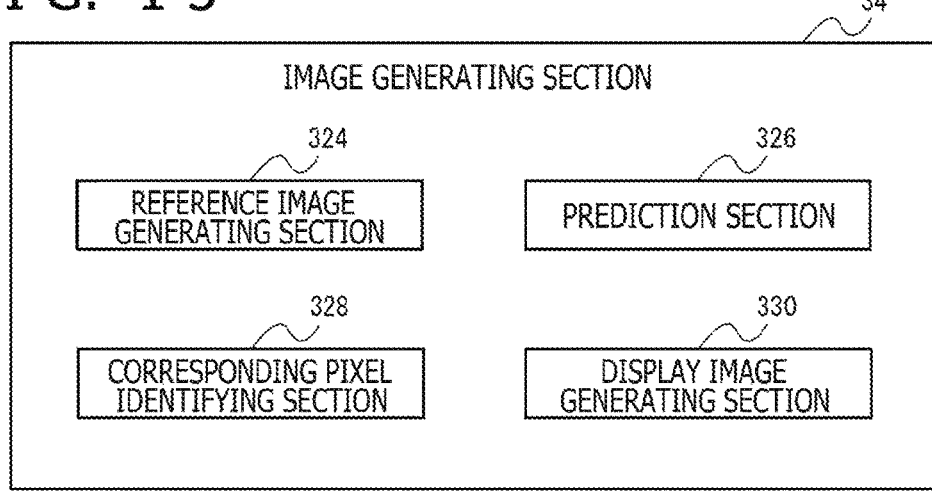
FIG. 15 is a block diagram illustrating details of an image generating section in FIG. 5.

FIG. 15 is a block diagram illustrating details of the image generating section 34 in FIG. 5. The imaging generating section 34 includes a reference image generating section 324, a prediction section 326, a corresponding pixel identifying section 328, and a display image generating section 330.

The reference image generating section 324 generates a reference image that includes information to be presented to the user in accordance with a first attitude of the HMD identified by the result of detection by the motion detecting section 30 at the first point in time. For example, the reference image generating section 324 generates a reference image indicative of how the virtual space appears in accordance with both the visual line direction determined by the visual line determining section 32 based on the result of detection by the motion detecting section 30 and a content image stored in the image storing section 40. When the user's operations (e.g., operations to move a character, etc.) are received through the instruction acquiring section 24, the reference image generating section 324 generates a reference image indicative of how the virtual space is updated in a manner reflecting the received operations. The first point in time corresponds to the timing T1 or T2 in FIG. 11, for example. In the ensuing description, it is assumed that the attitude of the HMD includes the visual line direction of the HMD (i.e., of the user). The attitude may thus be replaced with the visual line direction where appropriate. The data of the reference image includes RGB data and YUV data about each of the pixels in the image.

The display image generating section 330 generates a display image from the reference image in accordance with the difference between a second attitude of the HMD identified by the result of detection by the motion detecting section 30 at the second point in time following the first point in time on the one hand, and the first attitude used as the basis for generating the reference image on the other hand. Upon generation of the display image, the later the timing for displaying the specific image during display of the display image on the display panel 130 of the HMD 100, the larger the amount of displacement is made by the display image generating section 330 between the position of a specific pixel in the display image on the one hand, and the position of the corresponding pixel in the reference image serving as the source from which to set the pixel value of the specific pixel on the other hand. Also, the later the timing for the scanning line that displays the specific pixel in the display image to output the image, the larger the above-mentioned amount of displacement is made by the display image generating section 330. This embodiment implements this display image generating process through coordination between the corresponding pixel identifying section 328 and the display image generating section 330. How the process is implemented is explained below in detail.

In accordance with the difference between the second attitude of the HMD identified by the result of detection by the motion detecting section 30 at the second point in time following the first point in time on the one hand and the first attitude used as the basis for generating the reference image on the other hand, the corresponding pixel identifying section 328 identifies the corresponding pixel in the reference image corresponding to each pixel in the display image to be displayed on the HMD. In a manner reflecting the difference between the first attitude and the second attitude, the corresponding pixel identifying section 328 identifies a pixel in the reference image that is at a position different from that of the specific pixel in the display image as the corresponding pixel corresponding to the specific pixel in the display image. The second point in time corresponds to the timing T1' or T2' in FIG. 11, for example. As mentioned above, the difference between attitudes may also be considered the difference between visual line directions.

The later the timing for displaying the specific pixel during display of the display image on the display panel 130 of the HMD 100, the larger the amount of displacement is made by the corresponding pixel identifying section 328 between the position of the specific pixel in the display image and the position of the corresponding pixel in the reference image. In other words, the later the timing for displaying a given pixel in the display image on the display panel 130 of the HMD 100, the farther the pixel in the reference image away from the position of the pixel of interest in the display image that is identified as the corresponding pixel by the corresponding pixel identifying section 328.

More specifically, the later the timing for the scanning line displaying the specific pixel in the display image to output the image, the larger the amount of displacement is made by the corresponding pixel identifying section 328 between the position of the specific pixel in the display image and the position of the corresponding pixel in the reference image. With this embodiment, the lower the scanning line displaying the specific pixel in the display image is positioned, i.e., the lower the vertical position of the specific pixel in the display image, the farther the pixel in the reference image identified as the corresponding pixel is positioned away from the position of the pixel of interest in the display image. The position of the pixel in the image may be identified as coordinates in a UV coordinate system, for example. Specific examples of identifying the corresponding pixel will be discussed later.

On the basis of the attitude of the HMD 100 at a given point in time and the attitude of the HMD 100 at another point in time, the prediction section 326 predicts the attitude of the HMD 100 at still another point in time. For example, based on the amount of displacement between the attitude of the HMD 100 at a past point in time and the attitude of the HMD 100 at the present moment, the prediction section 326 predicts the attitude of the HMD 100 at a future point in time. The attitude predicting process to be performed by the prediction section 326 may be implemented using existing prediction techniques.

The display image generating section 330 generates the display image by setting the pixel value of the corresponding pixel in the reference image as the pixel value of the specific pixel in the display image. For example, the display image generating section 330 may set the RGB data and YUV data about the corresponding pixel identified by the corresponding pixel identifying section 328 with respect to each pixel in the display image. If the reference image does not have the corresponding pixel corresponding to the specific pixel in the reference image, i.e., if the corresponding pixel identifying section 328 identifies a position outside the range of the reference image as the position of the corresponding pixel for example, the display image generating section 330 may set a predetermined fixed value as the pixel value of the specific pixel.

A specific example of identifying the corresponding pixel is explained below. The corresponding pixel identifying section 328 selects each pixel in the display image as the specific pixel, and identifies the corresponding pixel individually for each selected pixel in the display image. This process may be performed successively in units of pixels, or parallelly on multiple pixels at a time.

Based on the difference between the first attitude of the HMD 100 identified by the result of detection by the motion detecting section 30 at the first point in time on the one hand and the second attitude of the HMD 100 identified by the result of detection by the motion detecting section 30 at the second point in time after the first point in time on the other hand, and in accordance with the time required for the display panel 130 to display the image, the corresponding pixel identifying section 328 identifies the corresponding pixel at the point in time at which the display image is displayed on the top scanning line of the display panel 130, as a top line corresponding pixel. In like manner, the corresponding pixel at the point in time at which the display image is displayed on the bottom scanning line of the display panel 130 is identified as a bottom line corresponding pixel.

The corresponding pixel identifying section 328 identifies the actual corresponding pixel (also called the true corresponding pixel) corresponding to the specific pixel in accordance with the position of the top line corresponding pixel in the reference image, the position of the bottom line corresponding pixel, and the position of the scanning line on which the specific pixel is actually displayed. Specifically, on the basis of the position of the scanning line on which the specific pixel is actually displayed, the corresponding pixel identifying section 328 identifies the position of the actual corresponding pixel between the position of the top line corresponding pixel and the position of the bottom line corresponding pixel. In other words, through linear interpolation based on the position of the scanning line on which the specific pixel is actually displayed, the corresponding pixel identifying section 328 identifies the actual corresponding pixel from among the pixels positioned between the top line corresponding pixel and the bottom line corresponding pixel.

Figure 16:
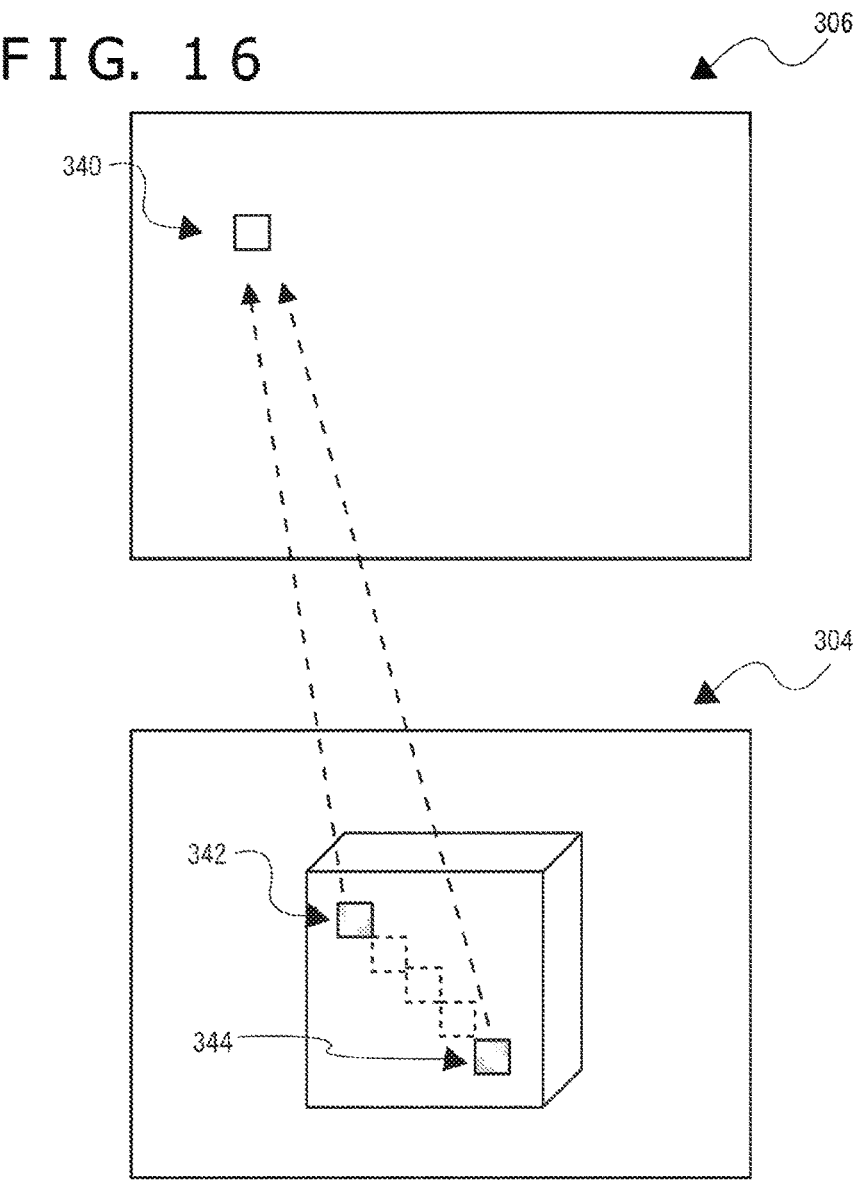
FIG. 16 is a set of schematic diagrams schematically illustrating a method of identifying a corresponding pixel.

FIG. 16 is a set of schematic diagrams schematically illustrating one method of identifying the corresponding pixel. For purpose of explanation, it is assumed that the attitude (visual line direction) of the HMD 100 is moved in the bottom right direction and that this is a reprojection process performed over the reprojection period 300 in FIG. 11. First, the corresponding pixel identifying section 328 identifies both the position of a top line corresponding pixel 342 in the reference image 304 corresponding to a specific pixel 340 in the display image 306 and the position of a bottom line corresponding pixel 344 in the reference image 304 corresponding to the specific pixel 340 (both positions are assumed to be on a UV plane, with the former position referred to as "uv1" and the latter position as "uv2" hereunder).

Specifically, based on the difference between the attitude T1 of the HMD 100 detected at the timing T1 in FIG. 11 and the attitude T1' of the HMD 100 detected at the timing T1', the prediction section 326 predicts an attitude Ts of the HMD 100 at a timing Ts at which the display panel 130 starts to display the display image 306. For example, if the attitude is moved in the bottom right direction between the timings T1 and T1', the prediction section 326 may predict the attitude Ts by changing the attitude T1' further in the bottom right direction for a time period from the timing T1' to the timing Ts. With this embodiment, the timing Ts is identified as the point in time at the end of a predetermined time period that is defined by estimate or by experiment as the time period expected to elapse until display begins following the reprojection process started at the present moment. The timing Ts may be considered the timing T2 in FIG. 11. In such a case, the prediction section 326 may predict the attitude Ts by changing the attitude T1' over the time period between the timings T1' and T2 (a predetermined time period).

On the basis of the difference between the attitude Ts predicted by the prediction section 326 and the attitude T1, the corresponding pixel identifying section 328 identifies the position of the top line corresponding pixel 342 (uv1) corresponding to the specific pixel 340. For example, if the attitude Ts turns out to be shifted by five units in the bottom right direction relative to the attitude T1, it is necessary to shift the reference image 304 by five units in the top left direction. In this case, the corresponding pixel identifying section 328 identifies as uv1 the position reached by shifting the position of the specific pixel 340 in the display image 306 by five units in the bottom right direction.

In a variation, the timing T1' may be considered artificially the timing Ts because the interval between the timings T1' and Ts is appreciably short. In this case, the corresponding pixel identifying section 328 may identify the position of the top line corresponding pixel 342 corresponding to the specific pixel 340 on the basis of the difference between the attitudes T1 and T1'.

Also, based on the difference between the attitude T1 of the HMD 100 detected at the timing T1 in FIG. 11 and the attitude T1' of the HMD 100 detected at the timing T1', the prediction section 326 predicts an attitude Tf of the HMD 100 at a timing Tf at which the display panel 130 will fully display the display image 306. The interval between the timings Ts and Tf is the time period that elapses from the time the display panel 130 starts to display one image until the display image is completed. This time period is determined by the refresh rate of the display panel 130. Thus the prediction section 326 may calculate the time required for image display based on the refresh rate of the display panel 130 stored in the environment information storing section 320. The prediction section 326 may change the attitude Ts for the calculated required time, thereby predicting the attitude Tf.

With the embodiment, it is assumed that the refresh rate of the display panel 130 is 120 Hz and that the time required for image display on the display panel 130 is 8.3 ms (8.333 μs). For example, if there is a shift of the attitude in the bottom right direction between the timings T1 and T1', the prediction section 326 may predict the attitude Tf by further changing the attitude T1' in the bottom right direction for the time period between the timings T1' and Ts plus 8.3 ms.

The corresponding pixel identifying section 328 identifies the position (uv2) of the bottom line corresponding pixel 344 corresponding to the specific pixel 340 on the basis of the difference between the attitude T1 and the attitude Tf predicted by the prediction section 326. For example, if the attitude Tf is found shifted by seven units in the bottom right direction relative to the attitude T1, it is necessary to shift the reference image 304 by seven units in the top left direction. In this case, the corresponding pixel identifying section 328 identifies as uv2 the position reached by shifting the position of the specific pixel 340 in the display image 306 by seven units in the bottom right direction. Typically, the difference between the attitude T1 and the attitude Tf becomes larger than the difference between the attitude T1 and the attitude Ts. Thus the degree of divergence between the position of the specific pixel 340 and the position of the bottom line corresponding pixel 344 becomes larger than the degree of divergence between the position of the specific pixel 340 and the position of the top line corresponding pixel 342.

The corresponding pixel identifying section 328 identifies the corresponding pixel position (UV) in the reference image 304 by carrying out the following calculations:

Scanning line factor=vertical position of the specific pixel in the display image 306÷number of vertical pixels on the display panel 130  (mathematical expression 1)

$UV = uv1 + $ scanning line factor $\times (uv2 - uv1)$  (mathematical expression 2)

The vertical position of the specific pixel in the display image 306 may be considered the position of the scanning line that displays the specific pixel. The number of vertical pixels on the display panel 130 may be considered the number of scanning lines on the display panel 130. For example, that number is 1,080. The corresponding pixel identifying section 328 acquires the number of vertical pixels on the display panel 130 from the environment information storing section 320.

The mathematical expression 1 above is used to obtain the ratio of the vertical position of the specific pixel with respect to the entire screen. The mathematical expression 2 above is used to obtain, as the corresponding pixel, the pixel which corresponds to the vertical position of the specific pixel and which is positioned between the top line corresponding pixel 342 and the bottom line corresponding pixel 344. The lower the vertical position of the specific pixel in the display image 306, i.e., the later the timing for displaying the specific pixel on the display panel 130, the closer the position UV to uv2 that has a larger amount of displacement than uv1. As a result, the lower the vertical position of the specific pixel in the display image 306, the larger the amount of divergence between UV and the position of the specific pixel in the display image 306. This provides the display image 306 such as one illustrated in Subfigure 14(b).

The operation of the information processing system 1 configured as described above is explained below.

The user starts a VR application on the information processing apparatus 10 and wears the HMD 100 on the head. During play of the VR application, the user moves the head as needed for search through the virtual space, for example. The HMD 100 periodically provides sensor information to the information processing apparatus 10. The imaging device 7 periodically provides captured images to the information processing apparatus 10. The motion detecting section 30 in the information processing apparatus 10 detects the attitude of the HMD 100 based on the sensor information and on the captured image. The visual line direction determining section 32 determines the visual line direction of the HMD 100 based on the attitude of the HMD 100.

The reference image generating section 324 in the information processing apparatus 10 renders the reference image in accordance with the visual line direction of the HMD 100 at the first point in time. The corresponding pixel identifying section 328 performs reprojection in accordance with the visual line direction of the HMD 100 at the second point in time following the first point in time, thereby generating the display image through transformation of the rendered reference image. At this time, the higher the pixel positioned in the display image, the smaller the amount of displacement is made by the corresponding pixel identifying section 328 between the position of the pixel of interest and the position of the corresponding pixel in the reference image. Conversely, the lower the pixel positioned in the display image, the larger the amount of displacement is made between the position of the pixel of interest and the position of the corresponding pixel in the reference image. The display image generating section 330 sets the pixel value of the corresponding pixel corresponding to each of the pixels in the display image.

The image providing section 36 in the information processing apparatus 10 provides the HMD 100 with the display image generated by the display image generating section 330. The display panel 130 of the HMD 100 displays the display image successively from the top scanning line to the bottom scanning line of the display panel 130. The information processing apparatus 10 of this embodiment reduces latency through reprojection and provides the display image in a manner taking into account the delay time of image display on the display panel 130. This further reduces the user's feeling of discomfort with regard to the display image.

(Second embodiment)

The information processing apparatus 10 as a second embodiment of this invention differs from the first embodiment in that a future attitude is predicted at the time of generating the reference image. The paragraphs that follow will emphasize what makes the second embodiment different from the first embodiment, with redundant explanations omitted where appropriate. In the ensuing description, what will be referred to as the center scanning line may not be the scanning line positioned exactly at the center of the screen and may be a scanning line close to the center.

Upon acquisition of the result of detection by the motion detecting section 30 at the first point in time (e.g., T1 in FIG. 11), the prediction section 326 identifies a point in time at which the image based on the result of detection is displayed on the center scanning line of the display panel 130 (the identified point in time will be referred to as "the first target point in time" hereunder). In accordance with the result of detection by the motion detecting section 30 at the first point in time, the prediction section 326 predicts as a first attitude the attitude of the HMD 100 at the first target point in time. Specifically, the prediction section 326 may predict the first attitude at the first target point in time in accordance with the difference between the result of detection by the motion detecting section 30 at a point in time before the first point in time on the one hand, and the result of detection by the motion detecting section 30 at the first point in time on the other hand (the difference may alternatively be the difference between visual line directions).

The reference image generating section 324 generates the reference image based on the first attitude at the first target point in time predicted by the prediction section 326. This reference image may be considered to be optimized for display on the center scanning line of the display panel 130.

Upon acquisition of the result of detection by the motion detecting section 30 at a second point in time after the first point in time (e.g., T1' in FIG. 11), the prediction section 326 identifies a point in time at which the image based on the result of detection is displayed on the center scanning line of the display panel 130 (the identified point in time will be referred to as "the second target point in time" hereunder). And in accordance with the result of detection by the motion detecting section 30 at the second point in time, the prediction section 326 predicts as a second attitude the attitude of the HMD 100 at the second target point in time. Specifically, the prediction section 326 may predict the second attitude at the second target point in time in accordance with the difference between the result of detection by the motion detecting section 30 at the first point in time on the one hand and the result of detection by the motion detecting section 30 at the second point in time on the other hand (the difference may alternatively be the difference between visual line directions).

The first target point in time and the second target point in time are identified using existing techniques. For example, the first target point in time may be identified as the point in time at the end of a predetermined time period that is defined by estimate or by experiment as the time period expected to elapse until the display is made on the center scanning line following rendering and reprojection processes performed on the reference image Likewise, the second target point in time may be identified as the point in time at the end of a predetermined time period that is defined by estimate or by experiment as the time period expected to elapse until the display is made on the center scanning line following the reprojection process.

In accordance with the difference between the first attitude and the second attitude, the corresponding pixel identifying section 328 identifies the corresponding pixel at the point in time at which the display image is displayed on the center scanning line of the display panel 130 as a temporary corresponding pixel (called "the center line corresponding pixel" hereunder). For example, if the second attitude is found shifted by five units in the bottom right direction relative to the first attitude, the corresponding pixel identifying section 328 identifies as the corresponding pixel the pixel in the position reached by shifting the position of the specific pixel in the display image by five units in the bottom right direction. As mentioned above, the first and the second attitudes are each a predicted attitude at the point in time at which the center scanning line on the display panel 130 displays the image. Thus the corresponding pixel identified here is the center line corresponding pixel.

When the scanning line on which the specific pixel in the display image is actually displayed is positioned above the center scanning line of the display panel 130, the corresponding pixel identifying section 328 identifies the actual corresponding pixel in such a manner that the amount of displacement between the position of the specific pixel in the display image and the position of the actual corresponding pixel in the reference image becomes smaller than the amount of displacement between the position of the specific pixel in the display image and the position of the center line corresponding pixel in the reference image. Typically, this applies to the case where the vertical position of the specific pixel in the display image is above the center of the display image.

When the scanning line on which the specific pixel in the display image is actually displayed is positioned below the center scanning line of the display panel 130, the corresponding pixel identifying section 328 identifies the actual corresponding pixel in such a manner that the amount of displacement between the position of the specific pixel in the display image and the position of the actual corresponding pixel in the reference image becomes larger than the amount of displacement between the position of the specific pixel in the display image and the position of the center line corresponding pixel in the reference image. Typically, this applies to the case where the vertical position of the specific pixel in the display image is below the center of the display image.

Figure 17:
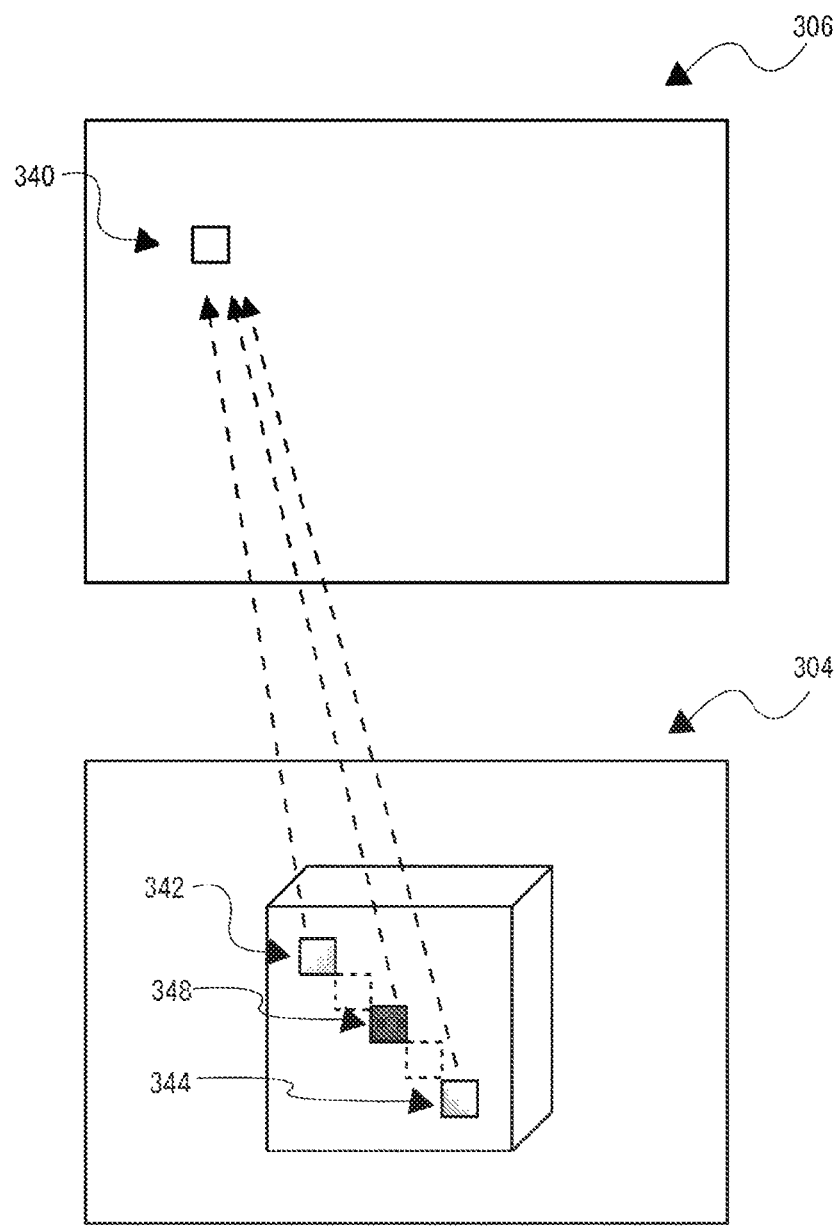
FIG. 17 is a set of schematic diagrams schematically illustrating another method of identifying the corresponding pixel.

FIG. 17 is a set of schematic diagrams schematically illustrating another method of identifying the corresponding pixel. For this example, it is assumed that the attitude of the HMD 100 (visual line direction) is moved in the bottom right direction and that this is a reprojection process performed over the reprojection period 300 in FIG. 11. First, the corresponding pixel identifying section 328 identifies the position of a center line corresponding pixel 348 (the position will be called "uv3" hereunder) using the method described above.

Next, using known techniques, the prediction section 326 predicts the attitude at a point in time 4,167 µs before the second target point in time as the attitude Ts of the timing for starting image display, and also predicts the attitude at a point in time 4,167 µs after the second target point in time as the attitude Tf of the timing for completing image display. The interval of "4,167 µs" is half the time required for the display panel 130 to display one image. The prediction section 326 determines the parameter "4,167 µs" in accordance with the refresh rate of the display panel 130 stored in the environment information storing section 320. If the refresh rate of the display panel 130 stored in the environment information storing section 320 is changed, the parameter is changed accordingly.

As with the first embodiment, the corresponding pixel identifying section 328 identifies the position (uv1) of the top line corresponding pixel 342 corresponding to the specific pixel 340 on the basis of the difference between the attitude T1 and the attitude Ts. Also, based on the difference between the attitude T1 and the attitude Tf, the corresponding pixel identifying section 328 identifies the position (uv2) of the bottom line corresponding pixel 344 corresponding to the specific pixel 340.

The corresponding pixel identifying section 328 identifies the corresponding pixel position (UV) in the reference image 304 by carrying out the following calculations:

Scanning line factor=vertical position of the specific pixel in the display image 306÷number of vertical pixels on the display panel 130−0.5     (mathematical expression 3)

$UV=uv3+$scanning line factor × $(uv2-uv1)$     (mathematical expression 4)

The mathematical expression 3 above is used to obtain the ratio of the vertical position of the specific pixel with respect to the center scanning line on the display panel 130. If the vertical position of the specific pixel is above the center of the screen, the scanning line factor is negative. In that case, UV is smaller than uv3. That is, the amount of divergence between UV and the position of the specific pixel in the display image 306 becomes small. On the other hand, if the vertical position of the specific pixel is below the center of the screen, the scanning line factor is positive. In this case, UV is larger than uv3. That is, the amount of divergence between UV and the position of the specific pixel in the display image 306 becomes larger. As a result, the display image 306 such as one illustrated in Subfigure 14(b) is generated.

Where the future attitude is predicted at the time of generating the reference image by the second embodiment, it is possible to identify the corresponding pixel using the same method as that of the first embodiment. However, in experiments conducted by the inventors, the reference image itself was optimized for display on the center scanning line. Thus it was confirmed that a more accurate display image is generated using the method of the second embodiment that identifies the actual corresponding pixel using the center line corresponding pixel 348.

(Third embodiment)

As with the second embodiment, a third embodiment of this invention predicts the future attitude at the time of generating the reference image. In the reprojection process, however, the third embodiment identifies the corresponding pixel using a method different from that of the second embodiment.

The reference image generating section 324 and the prediction section 326 in the third embodiment are configured the same as in the second embodiment. That is, upon acquisition of the result of detection by the motion detecting section 30 at the first point in time (e.g., T1 in FIG. 11), the prediction section 326 predicts the first target point in time at which the image based on the result of detection is displayed on the center scanning line of the display panel 130. In accordance with the result of detection by the motion detecting section 30 at the first point in time, the prediction section 326 predicts as the first attitude the attitude of the HMD 100 at the first target point in time. The reference image generating section 324 generates the reference image based on the first attitude at the first target point in time predicted by the prediction section 326.

Upon acquisition of the result of detection by the motion detecting section 30 at the second point in time (T1' in FIG. 11) after the first point in time, the prediction section 326 predicts the second target point in time at which the image based on the result of detection is displayed on the center scanning line of the display panel 130. In accordance with the result of detection by the motion detecting section 30 at the second point in time, the prediction section 326 predicts as the second attitude the attitude of the HMD 100 at the second target point in time.

Based on the difference between the first attitude and the second attitude, the corresponding pixel identifying section 328 identifies the center line corresponding pixel as the corresponding pixel at the point in time at which the display image is displayed on the center scanning line of the display panel 130. On the basis of the difference in time between the first target point in time and the second target point in time and in accordance with the position of the scanning line on which the specific pixel is actually displayed, the corresponding pixel identifying section 328 identifies the actual corresponding pixel corresponding to the specific pixel on a virtual straight line that passes through the position of the specific pixel in the display image and the position of the center line corresponding pixel in the reference image.

Figure 18:
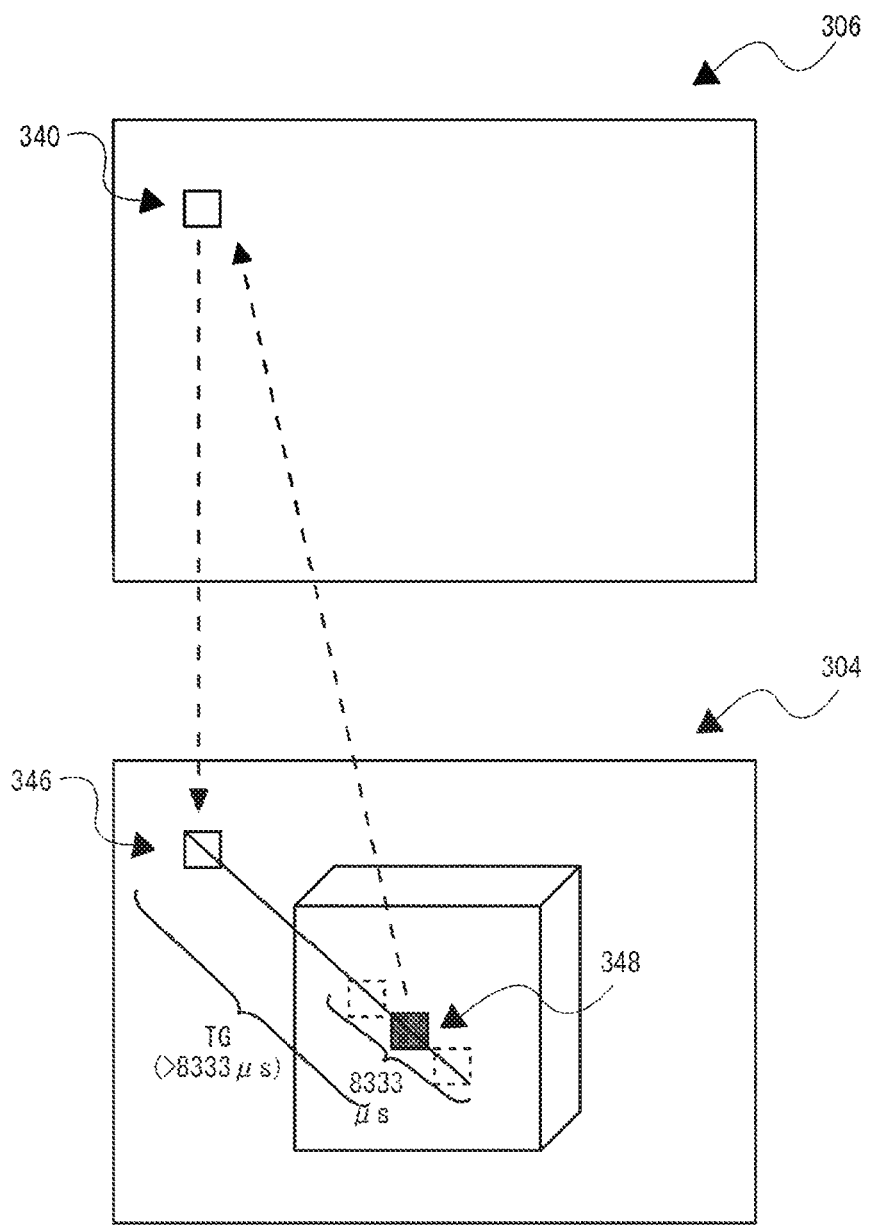
FIG. 18 is a set of schematic diagrams schematically illustrating another method of identifying the corresponding pixel.

FIG. 18 is a set of schematic diagrams schematically illustrating another method of identifying the corresponding pixel. For this example, it is assumed that the attitude of the HMD 100 (visual line direction) is moved in the bottom right direction and that this is a reprojection process performed over the reprojection period 300 in FIG. 11. First, as with the second embodiment, the corresponding pixel identifying section 328 identifies uv3 as the position of the center line corresponding pixel 348 corresponding to the specific pixel 340.

The corresponding pixel identifying section 328 acquires the information about the first target point in time and the second target point in time from the prediction section 326, and calculates a time gap (called the TG hereunder) between the first target point in time and the second target point in time. The TG may also be considered the time required for the center line corresponding pixel 348 to move to an identically positioned pixel 346 (i.e., pixel at the same position as the specific pixel in the display image 306). The corresponding pixel identifying section 328 identifies the corresponding pixel position (UV) in the reference image 304 using the expressions illustrated below. It is assumed that uv0 represents the position (UV coordinate value) of the specific pixel 340 in the display image 306.

Scanning line factor=1−(0.5−vertical position of the specific pixel in the display image 306÷number of vertical pixels of the display panel 130)×8, 333÷TG     (mathematical expression 5)

$UV=uv0+$scanning line factor × $(uv3-uv0)$     (mathematical expression 6)

The value "8,333" in the mathematical expression 5 above denotes the time required for the display panel 130 to display one image. The corresponding pixel identifying section 328 determines this parameter in accordance with the refresh rate of the display panel 130 stored in the environment information storing section 320.

The mathematical expressions 5 and 6 above are used to calculate UV as the position on a virtual straight line that passes through uv0 and uv3. That is, the actual corresponding pixel corresponding to the specific pixel 340 may be identified on the virtual straight line that passes through uv0 and uv3. The lower the vertical position of the specific pixel, the larger the scanning line factor becomes, which permits identification of the corresponding pixel positioned the farther from uv0. As a result of this, the display image 306 such as one illustrated in Subfigure 14(b) is generated.

It is to be noted that the above calculations are based on the assumption that the TG is longer than the time required for the display panel 130 to display one image (TG>8,333 μs in the above example), i.e., that there is a certain difference between the first target point in time and the second target point in time. Despite these constraints, the method of the third embodiment needs only one temporary corresponding pixel (center line corresponding pixel in the above example) to be obtained beforehand for identifying the actual corresponding pixel. This permits rapid identification of the corresponding pixel.

With the third embodiment, the target point in time for attitude prediction is not limited to the point in time at which the image is displayed on the center scanning line of the display panel 130. For example, the target point in time may alternatively be the point in time at which the image is displayed on the top scanning line or the bottom scanning line of the display panel 130. In such a case, the mathematical expression 5 above needs to be modified depending on the target point in time selected for attitude prediction in generating the reference image. The position uv3 in the mathematical expression 6 needs to be changed to the position of the temporary corresponding pixel at the target point in time for attitude prediction. For example, if the target point in time for attitude prediction is the point in time at which the image is displayed on the bottom scanning line of the display panel 130, the position uv3 needs to be changed to the position uv2 of the bottom line corresponding pixel.

The present invention has been described above in conjunction with the first to the third embodiments. It is to be understood by those skilled in the art that suitable combinations of constituent elements and various processes of the embodiments described above as examples will lead to further variations of the present invention and that such variations also fall within the scope of this invention.

The example of reprojection illustrated in FIG. 11 is intended to reduce the latency between the time the attitude is detected and the time the image is displayed. Alternatively, reprojection may be performed to raise the frame rate. For example, while the first frame in FIG. 11 (reference image 304 in FIG. 12) is being displayed, the display frame based on the first frame in FIG. 11 (display image 306 in FIG. 12) may also be displayed so as to double the frame rate. The techniques of the above-described embodiments may be applied to that type of reprojection aimed at boosting the frame rate, which reduces the user's feeing of discomfort stemming from watching the display image.

With the above-described embodiments, the display panel 130 of the HMD 100 successively displays the display target image from the top scanning line down. However, this is not limitative of the sequence of display. The techniques of the above embodiments apply where at least some pixels of the display image are displayed later than the other pixels on the display panel 130 of the HMD 100.

With the above-described embodiments, the VR image is displayed on the display panel 130 of the HMD 100. If the HMD 100 is an optically transmissive display device, for example, an augmented reality (AR) image may be displayed thereon. The techniques of the above embodiments also apply to the AR image display.

With the above-described embodiments, the information processing apparatus 10 generates the image to be displayed on the HMD 100. Alternatively, the HMD 100 itself may be equipped with the image generating function explained in connection with the embodiments above.

Suitable combinations of the above-described embodiments and their variations are each effective as another embodiment of the present invention. The new embodiments thus implemented provide the effects of both the initial embodiments and the variations combined therewith. It will also be understood by those skilled in the art that the functions to be exerted by the components stated in the ensuring claims are implemented either by each of the components discussed above in connection with the embodiments and their variations or by a coordinated combination of these individual components.

REFERENCE SIGNS LIST

1 Information processing system
10 Information processing apparatus
30 Motion detecting section
36 Image providing section
100 HMD
324 Reference image generating section
326 Prediction section
328 Corresponding pixel identifying section
330 Display image generating section

INDUSTRIAL APPLICABILITY

The present invention is applicable to the apparatus for generating images to be displayed on the head-mounted display.

The invention claimed is:

1. An information processing apparatus comprising:
a detection section configured to detect respective attitudes of a head-mounted display worn on the head of a user at a plurality of sequential times;
a reference image generating section configured to generate a sequence of reference images, each via a new rendering process, and each in accordance with one of the respective attitudes of the head-mounted display; and
a display image generating section configured to generate a sequence of display images, each from a respective one of the sequence of reference images, and each by employing a transformation process to re-project each of a plurality of source pixels of the respective one of the reference images to each of a plurality of corresponding pixels of the respective one of the display images, where the transformation process is a function of a difference between an initial attitude of the head-mounted display at which the respective one of the reference images is rendered, and a subsequent attitude of the head-mounted display upon which the respective one of the display images is generated,
wherein, as respective delays increase between a time of detecting the subsequent attitude of the head-mounted display, and respective times that the corresponding pixels of the respective one of the display images are generated, respective displacements increase between the plurality of source pixels of the respective one of the reference images and the plurality of corresponding pixels of the respective one of the display images.

2. The information processing apparatus according to claim 1, wherein
each display image in the sequence of display images generated by the display image generating section is displayed successively from a scanning line at one end of the display image to a scanning line at another end thereof, and
the closer the scanning line on which the corresponding pixels are displayed is to the other end, the larger the amount of displacement is made by the display image generating section.

3. The information processing apparatus according to claim 2, further comprising
a corresponding pixel identifying section configured to identify a first pixel of the corresponding pixels at a point in time at which the corresponding pixels are displayed on the scanning line at the one end of the display image on the basis of both a difference between subsequent attitudes and the time required to display the display image, the corresponding pixel identifying section further identifying a second pixel of the corresponding pixels at a point in time at which the image is displayed on the scanning line at the other end of the display image, wherein, in accordance with the position of the scanning line on which the corresponding pixels are actually displayed, the corresponding pixel identifying section identifies, between the first pixel and the second pixel, an actual corresponding pixel.

4. The information processing apparatus according to claim 2, further comprising:
a prediction section configured to predict as a first attitude the attitude of the head-mounted display at a point in time at which the image is displayed on a center scanning line of the display section in accordance with the result of detection by the detection section at a first point in time, the prediction section further predicting as a second attitude the attitude of the head-mounted display at a point in time at which the image is displayed on a center scanning line of the display image in accordance with the result of detection by the detection section at the second point in time; and
a corresponding pixel identifying section, wherein
the reference image generating section generates the reference image in accordance with the first attitude predicted by the prediction section,
in accordance with the difference between the first attitude and the second attitude, the corresponding pixel identifying section identifies a temporary corresponding pixel as the corresponding pixel at the point in time at which the image is displayed on the center scanning line of the display section, and
when the scanning line on which the specific pixel is actually displayed is positioned on the side of the other end past the center of the display section, the corresponding pixel identifying section identifies the actual corresponding pixel in such a manner that the amount of displacement between the position of the specific pixel in the display image and the position of the actual corresponding pixel in the reference image becomes larger than the amount of displacement between the position of the specific pixel in the display image and the position of the temporary corresponding pixel in the reference image.

5. The information processing apparatus according to claim 2, further comprising:
a prediction section configured such that upon acquisition of the result of detection by the detection section at a first point in time, the prediction section predicts as the first point in time the point in time at which the image is displayed on a predetermined scanning line of the display image, the prediction section further predicting as a first attitude the attitude of the head-mounted display at the first point in time; and
a corresponding pixel identifying section,
wherein the reference image generating section generates the reference image in accordance with the first attitude predicted by the prediction section,
upon acquisition of the result of detection by the detection section at a second point in time, the prediction section predicts as the second point in time the point in time at which the image is displayed on the predetermined scanning line of the display image, the prediction section further predicting as a second attitude the attitude of the head-mounted display at the second point in time,
in accordance with the difference between the first attitude and the second attitude, the corresponding pixel identifying section identifies a temporary corresponding pixel as the corresponding pixel at the point in time at which the image is displayed on the predetermined scanning line of the display section, and
on the basis of a time gap between the first point in time and the second point in time and in accordance with the position of the scanning line on which the specific pixel is actually displayed, the corresponding pixel identifying section identifies the actual corresponding pixel corresponding to the specific pixel on a line that passes through the position of the specific pixel in the display image and the position of the temporary corresponding pixel in the reference image.

6. An image generating method, comprising:
detecting respective attitudes of a head-mounted display worn on the head of a user at a plurality of sequential times;
generating a sequence of reference images, each via a new rendering process, and each in accordance with one of the respective attitudes of the head-mounted display;
generating a sequence of display images, each from a respective one of the sequence of reference images, and each by employing a transformation process to re-project each of a plurality of source pixels of the respective one of the reference images to each of a plurality of corresponding pixels of the respective one of the display images, where the transformation process is a function of a difference between an initial attitude of the head-mounted display at which the respective one of the reference images is rendered, and a subsequent attitude of the head-mounted display upon which the respective one of the display images is generated,
wherein, as respective delays increase between a time of detecting the subsequent attitude of the head-mounted display, and respective times that the corresponding pixels of the respective one of the display images are generated, respective displacements increase between the plurality of source pixels of the respective one of the reference images and the plurality of corresponding pixels of the respective one of the display images.

7. A non-transitory, computer readable storage medium containing a computer program, which when executed by a computer, causes the computer to carry out actions, comprising:
detecting respective attitudes of a head-mounted display worn on the head of a user at a plurality of sequential times;
generating a sequence of reference images, each via a new rendering process, and each in accordance with one of the respective attitudes of the head-mounted display;
generating a sequence of display images, each from a respective one of the sequence of reference images, and each by employing a transformation process to re-project each of a plurality of source pixels of the respective one of the reference images to each of a plurality of corresponding pixels of the respective one of the display images, where the transformation process is a function of a difference between an initial attitude of the head-mounted display at which the respective one of the reference images is rendered, and a subsequent attitude of the head-mounted display upon which the respective one of the display images is generated, wherein, as respective delays increase between a time of detecting the subsequent attitude of the head-mounted display, and respective times that the corresponding pixels of the respective one of the display images are generated, respective displacements increase between the plurality of source pixels of the respective one of the reference images and the plurality of corresponding pixels of the respective one of the display images.

* * * * *